(12) United States Patent
Fairweather

(10) Patent No.: US 7,240,330 B2
(45) Date of Patent: Jul. 3, 2007

(54) USE OF ONTOLOGIES FOR AUTO-GENERATING AND HANDLING APPLICATIONS, THEIR PERSISTENT STORAGE, AND USER INTERFACES

(76) Inventor: John Fairweather, 1649 Wellesly Dr., Santa Monica, CA (US) 90405

( * ) Notice: Subject to any disclaimer, the term of this patent is extended or adjusted under 35 U.S.C. 154(b) by 567 days.

(21) Appl. No.: 10/357,283

(22) Filed: Feb. 3, 2003

(65) Prior Publication Data

US 2003/0200531 A1    Oct. 23, 2003

(51) Int. Cl.
*G06F 9/44* (2006.01)
(52) U.S. Cl. .................... 717/116; 717/114; 706/45; 706/46
(58) Field of Classification Search ................ 717/114, 717/116; 706/45, 46, 48, 59; 704/9, 270, 704/257; 715/500, 1, 513; 707/200, 10, 707/103 R, 104, 1, 5, 8, 4, 3, 101, 100
See application file for complete search history.

(56) References Cited

U.S. PATENT DOCUMENTS

| | | | | |
|---|---|---|---|---|
| 5,677,835 | A * | 10/1997 | Carbonell et al. ............. | 704/8 |
| 5,694,523 | A * | 12/1997 | Wical ........................... | 706/45 |
| 5,768,580 | A * | 6/1998 | Wical ........................... | 707/102 |
| 5,794,050 | A * | 8/1998 | Dahlgren et al. ........... | 717/144 |
| 5,995,920 | A * | 11/1999 | Carbonell et al. ............. | 704/9 |
| 6,061,675 | A * | 5/2000 | Wical ........................... | 706/45 |
| 6,076,088 | A * | 6/2000 | Paik et al. ..................... | 707/5 |
| 6,094,650 | A * | 7/2000 | Stoffel et al. .................. | 707/3 |
| 6,139,201 | A * | 10/2000 | Carbonell et al. ............. | 704/2 |
| 6,163,785 | A * | 12/2000 | Carbonell et al. ........... | 715/530 |
| 6,199,034 | B1 * | 3/2001 | Wical ........................... | 704/9 |
| 6,263,335 | B1 * | 7/2001 | Paik et al. ..................... | 707/5 |
| 6,289,338 | B1 * | 9/2001 | Stoffel et al. .................. | 707/3 |
| 6,487,545 | B1 * | 11/2002 | Wical ........................... | 706/45 |
| 6,564,263 | B1 * | 5/2003 | Bergman et al. ............ | 709/231 |

(Continued)

OTHER PUBLICATIONS

"Using the WFT Development Environment", Workflow Teplate Process Template, Template Software, 1998, Whole Manual.*

(Continued)

*Primary Examiner*—Todd Ingberg
(74) *Attorney, Agent, or Firm*—Merchant & Gould PC; Stanley J. Gradisar

(57) ABSTRACT

A system and environment in which the data within the system can be defined and manipulated in terms of a world model or Ontology, and for which the DBA and GUI portions of the programming tasks can be specified and automatically generated from this Ontology is provided. The invention includes the following components: extensions to a programming language that describe and abstract the logic associated with interacting with external 'persistent' storage; extensions to a programming language to handle type inheritance; extensions to the programming language to allow specification of the GUI content and layout; extensions to the programming language to allow specification and inheritance of scriptable actions; a means whereby the data described in the programming language can be translated automatically into generating the corresponding tables and fields in external databases and the queries and actions necessary to access those databases and read/write to them; a high level ontology designed to facilitate operation of the particular application being developed; and a means to tie types and their access into a suite of federated type or container/engine specific servers responsible for the actual persistence of the data. Other improvements and extensions are also claimed.

19 Claims, 13 Drawing Sheets

U.S. PATENT DOCUMENTS

| | | | |
|---|---|---|---|
| 6,640,231 B1 * | 10/2003 | Andersen et al. | 707/102 |
| 6,658,627 B1 * | 12/2003 | Gallup et al. | 715/536 |
| 6,678,677 B2 * | 1/2004 | Roux et al. | 707/3 |
| 6,728,692 B1 * | 4/2004 | Martinka et al. | 706/45 |
| 6,847,979 B2 * | 1/2005 | Allemang et al. | 707/102 |
| 6,950,793 B2 * | 9/2005 | Ross et al. | 704/9 |

OTHER PUBLICATIONS

Developing a WFT Workflow System, Workflow Teplate Process Template, Template Software, 1998, Whole Manual.*

* cited by examiner

| Name | Afghanistan |
|---|---|

| | Related | |
|---|---|---|
| ▽ | Name | Datum Type |
| 1 ▽ | Actor | |
| 2 ▽ | Entity | |
| 3 ▽ | Person | |
| 4 | Anon_2128544942_boeing_com | Person |
| 5 | Anon_959211409_boeing_com | Person |

USE OF ONTOLOGIES FOR AUTO-GENERATING AND HANDLING APPLICATIONS, THEIR PERSISTENT STORAGE, AND USER INTERFACES

CROSS-REFERENCES TO RELATED APPLICATIONS

This application is related to application Ser. No. 10/357,325 filed on Feb. 3, 2003 titled "System For Exchanging Binary Data" by the same inventor of this invention, and to application Ser. No. 10/357,288 filed on Feb. 3, 2003 titled "System Method For Managing Memory," now U.S. Pat. No. 7,103,749, by the same inventor of this invention, and to application Ser. No. 10/357,304 filed on Feb. 3, 2003 titled "System And Method For Managing Collections Of Data On A Network" by the same inventor of this invention, all of which are incorporated herein by reference in their entirety for all that is taught and disclosed therein.

INCORPORATION-BY-REFERENCE OF MATERIAL SUBMITTED ON A COMPACT DISC

Program Listing—A computer program listing appendix is submitted on two compact discs (Copy 1 and Copy 2). These discs are identical to each other. Each disc includes four ASCII files comprising one computer program listing appendix and three reference appendices. All material therein is hereby incorporated by reference in its entirety in this application. The names and indicated sizes of the files on the compact discs are: Appendix A (9.6 Kbytes), Appendix 1 (58.8 Kbytes), Appendix 2 (28.8 Kbytes), Appendix 3 (196.0 Kbytes). These files include the pseudo-code for a sample ontological definition for a country; the Types Patent Application; the Memory Patent Application; and the Collections Patent Application. These compact discs were created on Oct. 19, 2006 and are in IBM PC format and MS-Windows® operating system compatible.

BACKGROUND OF THE INVENTION

In any complex information system that accepts unstructured or semi-structured input (such as an intelligence system) for the external work, it is obvious that change is the norm, not the exception. Media and data streams are often modified and otherwise constantly change making it difficult to monitor them. Moreover, in any system involving multiple users with divergent requirements, even the data models and requirements of the system itself will be subject to continuous and pervasive change. By some estimates, more than 90% of the cost and time spent on software is devoted to maintenance and upgrade of the installed system to handle the inevitability of change. Even our most advanced techniques for software design and implementation fail miserably as the system is scaled or is otherwise changed. The reasons for this failure arise, at least in part, from the very nature of accepted software development practice/process.

Referring now to FIG. 1, the root of the problem with the current software development process, which we shall call the "Software Bermuda Triangle" effect, is shown. Conventional programming wisdom holds that during the design phase of an information processing application, programming teams should be split into three basic groups. The first group is labeled DBA (for Database Administrator) 105. These individuals 105 are experts in database design, optimization, and administration. This group 105 is tasked with defining the database tables, indexes, structures, and querying interfaces based initially on requirements, and later, on requests primarily from the applications group. These individuals 105 are highly trained in database techniques and tend naturally to pull the design in this direction, as illustrated by the small outward pointing arrow. The second group is the Graphical User Interface (GUI) group 110. The GUI group 110 is tasked with implementing a user interface to the system that operates according the customer's expectations and wishes and yet complies exactly with the structure of the underlying data (provided by the DBA group 105) and the application(s) behavior (as provided by the Apps group 115). The GUI group 110 will have a natural tendency to pull the design in the direction of richer and more elaborate user interfaces. Finally the applications group 115 is tasked with implementing the actual functionality required of the system by interfacing with both the DBA and the GUI and related Applications Programming Interfaces (APIs). This group 115, like the others 105,110 tends to pull things in the direction or more elaborate system specific logic. Each of these groups tends to have no more than a passing understanding of the issues and needs of the other groups. Thus during the initial design phase, assuming a strong project and software management process rigidly enforces design procedures, a relatively stable triangle is formed where the strong connections 120, 125, 130 enforced between each group by management are able to overcome the outward pull of each member of the triangle. Assuming a stable and unchanging set of requirements, such a process stands a good chance of delivering a system to the customer on time.

The problem, however, is that while correct operation has been achieved by each of the three groups 110, 105, 115 in the original development team, significant amounts of undocumented application, GUI, and Database specific knowledge has likely been embedded into all three of the major software components. In other words, this process often produces a volatile system comprised of these subtle and largely undocumented relationships just waiting to be triggered. After delivery (the bulk of the software life cycle), in the face of the inevitable changes forced on the system by the passage of time, the modified system begins to break down to yield a new "triangle" 150. Unfortunately, in many cases, the original team that built the system has disbanded and knowledge of the hidden dependencies is gone. Furthermore, system management is now in a monitoring mode only meaning that instead of having a rigid framework, each component of the system is now more likely to "drift". This drift is graphically represented by the dotted lines 155, 160, 165. During maintenance and upgrade phases, each change hits primarily one or two of the three groups. Time pressures, and the new development environment, mean that the individual tasked with the change (probably not an original team member) tends to be unaware of the constraints and naturally pulls outward in his particular direction. The binding forces have now become much weaker and more elastic while the forces pulling outwards have become much stronger. A steady supply of such changes impacting this system could well eventually break it apart. In such a scenario, the system will grind to a halt or become unworkable or un-modifiable. The customer must either continue to pay progressively more and more outrageous maintenance costs (swamping the original development costs), or must start again from scratch with a new system and repeat the cycle. The latter approach is often much cheaper than the former. This effect is central to why software systems are so expensive. Since change of all kinds is particularly pervasive in an intelligence system, any architecture for such systems would preferably address a way to eliminate this "Bermuda Triangle" effect.

Since application specific logic and it's implementation cannot be eliminated, what is needed is a system and environment in which the 'data' within the system can be defined and manipulated in terms of a world model or Ontology, and for which the DBA and GUI portions of the programming tasks can be specified and automatically generated from this Ontology thereby eliminating the triangle effect (and the need for the associated programming disciplines). Such an approach would make the resultant system robust and adaptive to change.

SUMMARY OF INVENTION

The present invention provides a system capable of overcoming this effect and provides a system that is both robust and adaptive to change. The preferred base language upon which this system is built is the C programming language although other languages may be used. In the standard embodiment using the C programming language, the present invention is composed of the following components:

a) Extensions to the language that describe and abstract the logic associated with interacting with external 'persistent' storage (i.e., non-memory based). Standard programming languages do not provide syntax or operators for manipulating persistent storage and a formalization of this capability is desirable. This invention provides these extensions and the "extended" language is henceforth referred to as C*. C*, in addition to being a standard programming language, is also an ontology definition language (ODL).

b) Extensions to the C* language to handle type inheritance. In an ontology based system, the world with which the system interacts is broken down based on the kinds of things that make up that world, and by knowledge of the kind of thing involved, it becomes possible to perform meaningful calculations on that object without knowledge of the particulars of the descendant type. Type inheritance in this context therefore more accurately means ancestral field inheritance (as will be described later).

c) Extensions to the C* language to allow specification of the GUI content and layout.

d) Extensions to the C* language to allow specification and inheritance of scriptable actions on a per-field and per-type basis. Similar extensions to allow arbitrary annotations associated with types and fields are also provided.

e) A means whereby the data described in the C* language can be translated automatically into generating the corresponding tables and fields in external databases and the queries and actions necessary to access those databases and read/write to them. This aspect of the invention enables dynamic creation of databases as data is encountered.

f) A high level ontology designed to facilitate operation of the particular application being developed. In the examples below and in the preferred embodiment, the application being developed will address the problem of 'intelligence' i.e., the understanding of 'events' happening in the world in terms of the entities involved, their motives, and the disparate information sources from which reports are obtained.

g) A means to tie types and their access into a suite of federated type or container/engine specific servers responsible for the actual persistence of the data.

A necessary prerequisite for tackling the triangle problem is the existence of a run-time accessible (and modifiable) types system capable of describing arbitrarily complex binary structures and the references between them. In the preferred embodiment, the invention uses the system that has been previously described in Appendix 1 (hereinafter, the "Types Patent Application"now U.S. Patent Application Publication 2004/0073913 A1). Another prerequisite is a system for instantiating, accessing and sharing aggregates of such typed data within a standardized flat memory model and for associating inheritable executable and/or interpreted script actions with any and all types and fields within such data. In the preferred embodiment, the present invention uses the system and method that is described in Appendix 2 (hereinafter, the "Memory Patent Application"now U.S. Patent Application Publication 2004/0073913 A1). The material presented in these two patent application publication are expressly incorporated herein. Additional improvements and extensions to this system will also be described below and many more will be obvious to those skilled in the art.

BRIEF DESCRIPTION OF THE FIGURES

FIG. 7B shows an example of one way that a collection reference field ('@@') might be displayed in an auto-generated user interface.

FIG. 11 shows a sample embodiment of the geography page within Country.

FIG. 12 shows a sample embodiment of the second sub-page of the geography page within country.

DETAILED DESCRIPTION OF THE INVENTION

Figure 1:
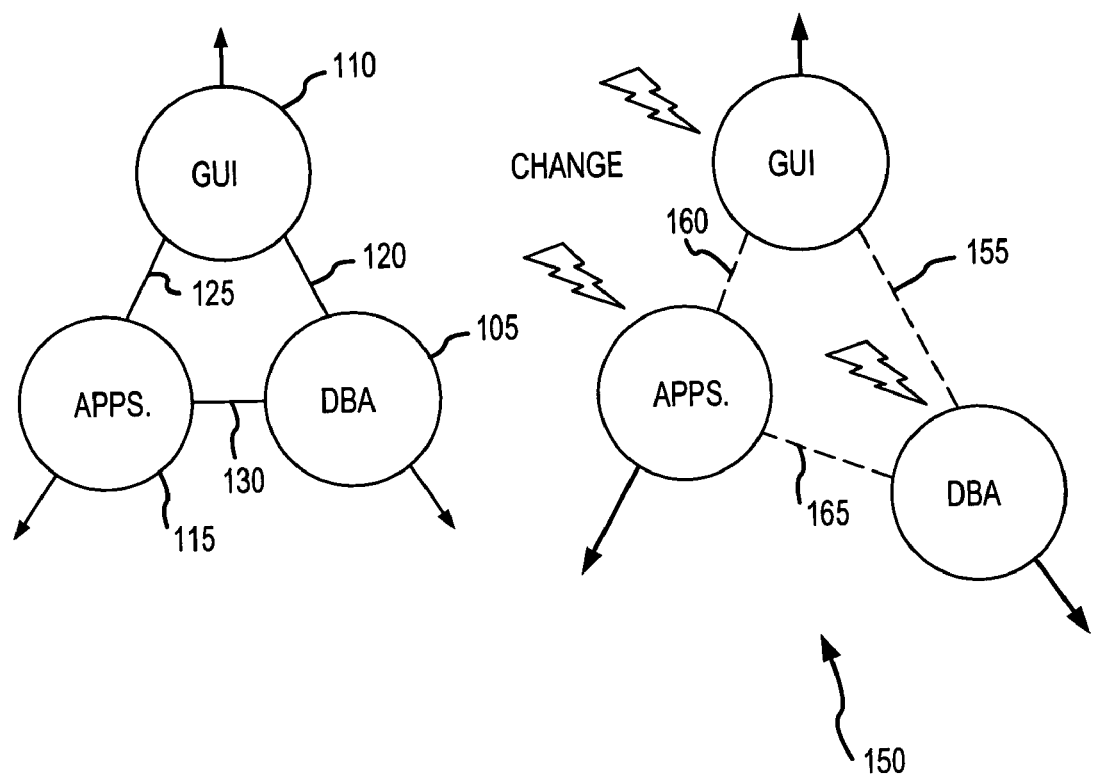
FIG. 1 shows the root of the problem with the current software development process, which we shall call the "Software Bermuda Triangle" effect.

As described above, a necessary prerequisite for tackling the triangle problem is the existence of a run-time accessible (and modifiable) types system capable of describing arbitrarily complex binary structures and the references between them. In the preferred embodiment, the invention uses the system described in the Types Patent Application. Another prerequisite is a system for instantiating, accessing and sharing aggregates of such typed data within a standardized flat memory model and for associating inheritable executable and/or interpreted script actions with any and all types and fields within such data. In the preferred embodiment, the present invention uses the system and method that is described in the Memory Patent Application. The material presented in these two patent applications are expressly incorporated herein and the functions and features of these two systems will be assumed for the purposes of this invention.

As an initial matter, it is important to understand some of the language extensions that are needed in order to create an Ontology Description Language (ODL). In the preferred embodiment, the following operators/symbols are added to the basic C language (although other symbols and syntax are obviously possible without changing the basic nature of the approach) in order to provide basic support for the items described herein:

| | |
|---|---|
| script | used to associate a script with a type or field |
| annotation | used to associate an annotation with a type or field |
| @ | relative reference designator (like '*' for a pointer) |
| @@ | collection reference designator |
| # | persistent reference designator |
| <on> | script and annotation block start delimiter |
| <no> | script and annotation block end delimiter |
| >< | echo field specification operator |
| : | type inheritance |

Additionally, the syntax for a C type definition has been extended to include specification of the "key data-type" associated with a given ontological type as follows:

typedef struct X 'XXXX' { ... };

Where the character constant 'XXXX' specifies the associated key data-type. The persistent reference designator '#' implies a singular reference to an item of a named type held in external storage. Such an item can be referenced either by name or by unique system-wide ID and given this information, the underlying substrate is responsible for obtaining the actual data referenced, adding it to the collection, and making the connection between the referencing field and the newly inserted data by means of a relative reference embedded within the persistent reference structure. Preferably, the binary representation of a persistent reference field is accomplished using a structure of type 'ET_PersistentRef' as defined below:

```
typedef struct ET_UniqueID
{
    OSType          system;                      // system id is 32 bits
    unsInt64        id;                          // local id is 64 bits
} ET_UniqueID;
typedef struct ET_PersistentRef
{
    ET_CollectionHdl  members;                   // member collection
    charHdl           stringH;                   // String containing mined text
    ET_TypeID         aTypeID;                   // type ID
    ET_Offset         elementRef;                // rel. ref. to data (NULL if !fetched)
    ET_Offset         memberRef;                 // rel. ref. to member coll. (or NULL)
    anonPtr           memoryRef;                 // pointer to type data (NULL if N/A)
    ET_UniqueID       id;                        // unique ID
    char              name [kPersRefNameSize];   // name of reference
} ET_PersistentRef, *ET_PersistentRefPtr;
```

The type ET_UniqueID consists of a two part 96-bit reference where the 64-bit 'id' field refers to the unique ID within the local 'system' which would normally be a single logical installation such as for a particular corporation or organization. Multiple systems can exchange data and reference between each other by use of the 32-bit 'system' field of the unique ID. The 'members' field of an ET_PersistentRef is used by the system to instantiate a collection of the possible items to which the reference is being made and this is utilized in the user interface to allow the user to pick from a list of possibilities. Thus for example if the persistent reference were "Country #nationality" then the member collection if retrieved would be filled with the names of all possible countries from which the user could pick one which would then result in filling in the additional fields required to finalize the persistent reference.

In normal operation, either the name or ID and type is known initially and this is sufficient to determine the actual item in persistent storage that is being referenced which can then be fetched, instantiated in the collection and then referenced using the 'elementRef' field. The contents of the 'stringH' field are used during data mining to contain additional information relating to resolving the reference. The 'aTypeID' field initially takes on the same value as the field type ID from which the reference is being made, however, once the matching item has been found, a more specific type ID may be assigned to this field. For example if the referencing field were of the form "Entity #owner" (a reference to an owning entity which might be a person, organization, country etc.) then after resolution, the 'aTypeID' field would be altered to reflect the actual sub-type of entity, in this case the actual owning entity. The 'memoryRef' field might contain a heap data reference to the actual value of the referenced object in cases where the referenced value is not to become part of the containing collection for some reason. Normally however, this field is not needed.

As an example of how the process of generating and then resolving a persistent reference operates, imagine the system has just received a news story referring to an individual who's name is "X", additionally from context saved during the mining process, the system may know such things as where "X" lives and this information could be stored in the 'stringH' field. At the time the reference to "X" is instantiated into persistent storage, a search is made for a person named "X" and, should multiple people called "X" be found in the database, the information in 'stringH' would be used in a type dependant manner to prune the list down to the actual "X" that is being referenced. At this point the system-wide ID for the specific individual "X" is known (as is whatever else the system knows about X) and thus the 'id' field of the reference can be filled out and the current data for "X" returned and referenced via "elementRef". If no existing match for "X" is found, a new "Person" record for "X" is created and the unique ID assigned to that record is returned. Thus it can be seen that, unlike a memory reference in a conventional programming language, a persistent reference may go through type specific resolution processes before it can be fully resolved. This need for a 'resolution' phase is characteristic of all references to persistent storage.

Like a persistent reference, the collection reference '@@' involves a number of steps during instantiation and retrieval. In the preferred embodiment, a collection reference is physically (and to the C* user transparently) mediated via the 'ET_CollectionRef' type as set forth below:

```
typedef struct ET_CollectionRef
{
    ET_CollectionHdl    collection;     // member collection
    charHdl             stringH;        // String containing mined text
    ET_TypeID           aTypeID;        // collection type ID (if any)
    ET_Offset           elementRef;     // relative reference to collection root
    ET_StringList       cList;          // collection member list (used for UI)
} ET_CollectionRef, *ET_CollectionRefPtr;
```

The first four fields of this structure have identical types and purposes to those of the ET_PersistentRef structure, the only difference being that the 'collection' field in this structure references the complete set of actual items that form part of the collection. The 'cList' field is used internally for user interface purposes. The means whereby the collections associated with a particular reference can be distinguished from those relating to other similar references is related to the meaning and use of the 'echo field' operator '><'. The following extracts from an actual ontology based on this system serve to reveal the relationship between the '><' operator and persistent storage references:

```
typedef struct Datum    'DTUM'                              // Ancestral type of all
pers. storage
{
    NumericID           hostID;                             // unique Host system ID
(0=local)
    unsInt64            id;                                 // unique ID
    char                name [256];                         // full name of this
Datum
    char                datumType [32];                     // the type of the datum
    NumericID           securityLevel;                      // security level
    char                updatedBy [30];                     // person
updating/creating this Datum
    Date                dateEntered;                        // date first entered
    Date                dateUpdated;                        // date of last update
    Feed                #source;                            // information source
for this Datum
    Language            #language;                          // language for this
Datum record
    struct
    {
        NoteRegarding   @@notes >< regarding;               // Notes regarding this
Datum
        NoteRelating    @@relatedTo >< related;             // Items X-referencing
this Datum
        NoteRelating    @@relatedFrom >< regarding;         // Items X-referencing
this Datum
        GroupRelation   @@relatedToGroup >< related;        // Groups X-referencing
```

-continued

```
this Datum
    GroupRelation   @@relatedFromGroup >< regarding;    // Groups X-referencing Datum
    Delta           @@history >< regarding;             // Time history of changes to Datum
    Category        @@membership;                       // Groupings Datum is a member of
    char            @@sourceNotes;                      // notes information source (s)
    unsInt64        sourceIDref;                        // ID reference in original source
  } notes;
  Symbology         #symbology;                         // symbology used
  Place             #place;                             // 'where' for the datum (if known)
} Datum , *DatumPtr;
typedef struct NoteRelating:Observation 'CXRF'          // Relationship between two datums
{
    Datum           #regarding >< notes.relatedFrom;    // 'source' item
    char            itemType [64];                      // Datum type for regarding item
    Datum           #related >< notes.relatedTo;        // 'target' item
    char            relatedType [64];                   // Datum type for related item
    RelationType    #relationType;                      // The type of the relationship
    Percent         relevance;                          // strength of relationship (1 . . 100)
    char            author [128];                       // Author of the StickIt Relating note
    char            title [256];                        // Full Title of StickIt Relating note
    char            @text;                              // descriptive text and notes
} NoteRelating;
```

In the preferred embodiment, 'Datum' is the root type of all persistent types. That is, every other type in the ontology is directly or indirectly derived from Datum and thus inherits all of the fields of Datum. The type 'NoteRelating' (a child type of Observation) is the ancestral type of all notes (imagine them as stick-it notes) that pertain to any other datum. Thus an author using the system may at any time create a note with his observations and opinions regarding any other item/datum held in the system. The act of creating such a note causes the relationships between the note and the datum to which it pertains to be written to and persisted in external storage. As can be seen, every datum in the system contains within its 'notes' field a sub-field called 'relatedFrom' declared as "NoteRelating @@relatedFrom >< regarding". This is interpreted by the system as stating that for any datum, there is a collection of items of type 'NoteRelating' (or a derived type) for which the 'regarding' field of each 'NoteRelating' item is a persistent reference to the particular Datum involved. Within each such 'NoteRelating' item there is a field 'relating' which contains a reference to some other datum that is the original item that is related to the Datum in question. Thus the 'NoteRelating' type is serving in this context as a bi-directional link relating any two items in the system as well as associating with that relationship a 'direction', a relevance or strength, and additional information (held in the @text field which can be used to give an arbitrary textual description of the exact details of the relationship). Put another way, in order to discover all elements in the 'relatedFrom' collection for a given datum, all that is necessary is to query storage/database for all 'NoteRelating' items having a 'regarding' field which contains a reference to the Datum involved. All of this information is directly contained within the type definition of the item itself and thus no external knowledge is required to make connections between disparate data items. The syntax of the C* declaration for the field, therefore, provides details about exactly how to construct and execute a query to the storage container(s)/database that will retrieve the items required. Understanding the expressive power of this syntax is key to understanding how it is possible via this methodology to eliminate the need for a conventional database administrator and/or database group to be involved in the construction and maintenance of any system built on this methodology.

As can be seen above, the 'regarding' field of the 'NoteRelating' type has the reverse 'echo' field, i.e., "Datum #regarding >< notes.relatedFrom;". This indicates that the reference is to any Datum or derived type (i.e., anything in the ontology) and that the "notes.relatedFrom" collection for the referenced datum should be expected to contain a reference to the NoteRelating record itself. Again, it is clear how, without any need for conventional database considerations, it is possible for the system itself to perform all necessary actions to add, reference, and query any given 'NoteRelating' record and the items it references. For example, the 'notes.relatedTo' field of any datum can reference a collection of items that the current datum has been determined to be related to. This is the other end of the 'regarding' link discussed above. As the type definitions above illustrate, each datum in the present invention can be richly cross referenced from a number of different types (or derivatives). More of these relationship types are discussed further herein.

For the purposes of illustrating how this syntax might translate into a concrete system for handling references and queries, it will assumed in the discussion below that the actual physical storage of the data occurs in a conventional relational database. It is important to understand, however, that nothing in this approach is predicated on or implies the need for a relational database. Indeed, relational databases are poorly suited to the needs of the kinds of system to which the technology discussed is targeted and are not utilized in the preferred embodiment. All translation of the syntax discussed herein occurs via registered script functions (as discussed further in the Collections Patent Application expressly incorporated herein (now U.S. Patent Application Publication 2004/0073913 A1) and thus there is no need to hard code this system to any particular data storage model so that the system can be customized to any data container or federation of such containers. For clarity of description, however, the concepts of relational database management systems (RDBMS) and how they work will be used herein for illustration purposes.

Before going into the details of the behavior of RDBMS plug-in functions, it is worth examining how the initial connection is made between these RDBMS algorithms and functions and this invention. As mentioned previously, this connection is preferably established by registering a number of logical functions at the data-model level and also at the level of each specific member of the federated data container set. The following provides a sample set of function prototypes that could apply for the various registration processes:

```
Boolean DB_SpecifyCallBack (            // Specify a persistent storage callback
    short           aFuncSelector,      // I:Selector for the logical function
    ProcPtr         aCallBackFn         // I:Address of the callback function
    )                                   // R:TRUE for success, FALSE otherwise
#define kFnFillCollection    1          // ET_FillCollectionFn -
                                        // Fn. to fill collection with data for a given a hit list
#define kFnFetchRecords      2          // ET_FetchRecordsFn -
                                        // Fn. to query storage and fetch matching records to colln.
#define kFnGetNextUniqueID   3          // ET_GetUniqueIdFn -
                                        // Fn. to get next unique ID from local persistent storage
#define kFnStoreParsedDatums 4          // ET_StoreParsedDatumsFn -
                                        // Fn. to store all extracted data in a collection.
#define kFnWriteCollection   5          // ET_WriteCollectionFn -
                                        // Fn. to store all extracted data in a collection
#define kFnDoesIdExist       6          // ET_DoesIdExistFn -
                                        // Fn. to determine if a given ID exists in persistent storage
#define kFnRegisterID        7          // ET_RegisterIDFn -
                                        // Fn. to register an ID to persistent storage
#define kFnRemoveID          8          // ET_RemoveIDFn -
                                        // Fn. to remove a given ID from the ID/Type registery
#define kFnFetchRecordToColl 9          // ET_FetchRecordToCollFn -
                                        // Fn. Fetch a given persistent storage item into a colln.
#define kFnFetchField        10         // ET_FetchFieldFn -
                                        // Fn. Fetch a single field from a single persistent record
#define kFnApplyChanges      11         // ET_ApplyChangesFn -
                                        // Fn. to apply changes
#define kFnCancelChanges     12         // ET_CancelChangesFn -
                                        // Fn. to cancel changes
#define kFnCountTypeItems    13         // ET_CountItemsFn -
                                        // Fn. to count items for a type (and descendant types)
#define kFnFetchToElements   14         // ET_FetchToElementsFn -
                                        // Fn. to fetch values into a specified set of elements/nodes
#define kFnRcrsvHitListQuery 15         // ET_RcrsvHitListQueryFn -
                                        // Fn. create a hit list from a type and it's descendants
#define kFnGetNextValidID    16         // ET_GetNextValidIDFn -
                                        // Fn. to find next valid ID of a type after a given ID
Booleen DB_DefineContainer (            // Defines a federated container
    charPtr            name
                       );               // R: Error code (0 = no error)
Boolean DB_DefinePluginFunction(        // Defines container plugin fn.
    charPtr            name,            // I: Name of container
    int32              functionType,    // I: Which function type
    ProcPtr            functionAddress  // I: The address of the function
                       );               // R: Void
```

-continued

| | | |
|---|---|---|
| #define kCreateTypeStorageFunc | 29 | // Create storage for a container |
| #define kInsertElementsFunc | 30 | // insert container data |
| #define kUpdateRecordsFromElementsFunc | 31 | // update container from data |
| #define kDeleteElementsFunc container | 32 | // delete elements from |
| #define kFetchRecordsToElementsFunc | 33 | // fetch container data |
| #define kInsertCollectionRecordFunc elements | 34 | // insert container data to |
| #(define kUpdateCollectionRecordFunc container | 35 | // update collection from |
| #define kDeleteCollectionRecordFunc | 36 | // delete collection record |
| #define kFetchRecordsToCollectionFunc colln. | 37 | // fetch container record to |
| #define kCheckFieldType container's | 38 | // determine if field is |

In this embodiment, whenever the environment wishes to perform any of the logical actions indicated by the comments above, it invokes the function(s) that have been registered using the function DB_SpecifyCallBack( ) to handle the logic required. This is the first and most basic step in disassociating the details of a particular implementation from the necessary logic. At the level of specific members of a federated collection of storage and querying containers, another similar API allows container specific logical functions to be registered for each container type that is itself registered as part of the federation. So for example, if one of the registered containers were a relational database system, it would not only register a 'kCreateTypeStorageFunc' function (which would be responsible for creating all storage tables etc. in that container that are necessary to handle the types defined in the ontology given) but also a variety of other functions. The constants for some of the more relevant plug-ins at the container level are given above. For example, the 'kCheckFieldType' plug-in could be called by the environment in order to determine which container in the federation will be responsible for the storage and retrieval of any given field in the type hierarchy. If we assume a very simple federation consisting of just two containers, a relational database, and an inverted text search engine, then we could imagine that the implementation of the 'kCheckFieldType' function for these two would be something like that given below:

```
// Inverted file text engine:
Boolean DTX_CheckFieldType         (                          // Field belongs
to 'TEXT" ?
                    ET_TypeID      aTypeID,                   // I: Type ID
                    charPtr        fieldname                  // I: Field name
                                   )                          // R: Error code
(0 = no error)
{
    ET_TypeID              fType,baseType;
    int32                  rType;
    Boolean                ret;
    fType = TM_GetFieldTypeID (NULL, aTypeID, fieldName);
    ret = NO;
    if ( TM_TypeIsReference (NULL, f Type, &rType, &baseType) && baseType ==
kInt8Type &&
                    (rType == kpointerRef || rType == kHandleRef || rType ==
kRelativeRef) )
            ret = YES;
    return ret;
}
// Relational database:
Boolean DSQ_CheckFieldType         (                          // Field belongs
to 'RDBM' ?
                    ET_TypeID      aTypeID,                   // I: Type ID
                    charPtr        fieldname                  // I: Field name
                                   )                          // R: Error code
(0 = no error)
{
    ET_TypeID              fType, baseT;
    int32                  refT;
    Boolean                ret;
    fType = TM_GetFieldTypeID (NULL, aTypeID, fieldname);
    ref = TM_TypeIsReference (NULL, fType, &refT, &baseT);
    ret = NO;
    if ( ref && refT == kPersistentRef )                      // We'll handle
pers. Refs.
            ret = YES;
    else if ( !ref && (                                       // We do:
            TM_IsTypeDescendant (NULL, fType, kInt8Type) ||   // char arrays,
```

```
        fType == TM_GetTypeID (NULL, "Date") ||           // Dates,
        TM_IsTypeDescendant (NULL, fType,kIntegerNumbersType)    ||    //
Integers and
        TM_IsTypeDescendant (NULL,fType,kRealNumbersType) ) )        //
Floating point #'s
        ret = YES;
    return ret;
}
```

As the pseudo-code above illustrates, in this particular federation, the inverted text engine lays claim to all fields that are references (normally '@') to character strings (but not fixed sized arrays of char) while the relational container lays claim to pretty much everything else including fixed (i.e., small sized) character arrays. This is just one possible division of responsibility is such a federation, and many others are possible. Other containers that may be members of such federations include video servers, image servers, map engines, etc. and thus a much more complex division of labor between the various fields of any given type will occur in practice. This ability to abstract away the various containers that form part of the persistent storage federation, while unifying and automating access to them, is a key benefit of the system of this invention.

Returning to the specifics of an RDBMS federation member, the logic associated with the 'kCreateTypeStorageFunc' plug-in for such a container (assuming an SQL database engine such as Oracle) might look similar to that given below:

DSQ_CreateLinkageTables( ) creates anonymous linkage tables (based on field names involved) to handle the case where a field of the type is a collection reference, and the reference is to a field in another type that is also a collection reference echoing back to the original field. After this function has been run for all types in the ontology, it is clear that the external relational database now contains all tables and linkage tables necessary to implement any storage, retrieval and querying that may be implied by the ontology. Other registered plug-in functions for the RDBMS container such as query functions can utilize knowledge of the types hierarchy in combination with knowledge of the algorithm used by DSQ_CreateTypeStorage( ), such as knowledge of the name adjustment strategy, to reference and query any information automatically based on type.

Note that some of the reference fields in the example above do not contain a '><' operator which implies that the ontology definer does not wish to have the necessary linking tables appear in the ontology. An example of such a field (as set forth above) is "Category @@membership". This field

```
static EngErr DSQ_CreateTypeStorage(           // Build SQL
tables
                ET_TypeID       theType   // I: The type
                            )                  // R: Error Code
(0 = no error)
{
    char        sqlStatement [256], filter [256];
    err = DSQ_CruiseTypeHierarchy(theType,DSQ_CreateTypeTable);
    sprintf(filter,                            // does linkage
table exist?
        "owner=(select username from all_users where user_id=uid) and "
        "table_name='LINKAGE_TABLES$'");
    if (#records found("all_tables", filter))  // If not, then
create it!
    {
        sprintf(sqlStatement, "create table LINKAGE_TABLES$
            (DYN_NAME varchar2(50),ACT_NAME varchar2(50)) tablespace data");
        err = SQL_ExecuteStatement(0, sqlStatement, NULL, 0, NULL);
    }
    err = DSQ_CruiseTypeHierarchy(theType, DSQ_CreateLinkageTables);
    . . . any other logic required
    return (err);
}
```

In this example, the function DSQ_CruiseTypeHierarchy( ) simply recursively walks the type hierarchy beginning with the type given down and calls the function specified. The function DSQ_CreateTypeTable( ) simply translates the name of the type (obtained from TM_GetTypeName) into the corresponding Oracle table name (possibly after adjusting the name to comply with constraints on Oracle table names) and then loops through all of the fields in the type determining if they belong to the RDBMS container and if so generates the corresponding table for the field (again after possible name adjustment). The function can be used to create an anonymous linkage table based on the type being referenced and the field name doing the referencing (after name adjustment). The linkage table would contain two references giving the type and ID of the objects being linked. When querying such an anonymous table, the plug-ins can deduce its existence entirely from the type information (and knowledge of the table creation algorithm) and thus the same querying power can be obtained even without the explicit definition of the linking table (as in the example above). Queries from the C* level are not possible directly on the fields of such a linkage table because it does not appear in the ontology, however, this technique is preferably used when such queries would not necessarily make sense.

By using this simple expedient, a system is provided in which external RDBMS storage is created automatically from the ontology itself, and for which subsequent access and querying can be handled automatically based on knowledge of the type hierarchy. This has effectively eliminated the need for a SQL database administrator or database programming staff. Since the same approach can be adopted for every container that is a member of the federation, these same capabilities can be accomplished simultaneously for all containers in the federation. As a result, the creator of a system based on this technology can effectively ignore the whole database issue once the necessary container plug-ins have been defined and registered. This is an incredibly powerful capability, and allows the system to adapt in an automated manner to changes in ontology without the need to consider database impact, thus greatly increasing system flexibility and robustness to change. Indeed, whole new systems based on this technology can be created from scratch in a matter of hours, a capability has been up until now unheard of. Various other plug-in functions may also be implemented, which can be readily deduced from this description.

The process of assigning (or determining) the unique ID associated with instantiating a persistent reference resulting from mining a datum from an external source (invoked via the $UniqueID script as further described in the Collections Patent Application) deserves further examination since it is highly dependant on the type of the data involved and because it further illustrates the systems ability to deal with such real-world quirks. In the simple federation described above, the implementation of the $UniqueID script for Datum (from which all other types will by default inherit) might be similar to that given below:

```
static EngErr PTS_AssignUniqueID(                              // $UniqueID script
registered with Datum
                ET_TypeDBHdl       aTypeDBHdl,                 // I:Type DB handle (NULL
to default)
                ET_TypeID          typeID,                     // I:Type ID
                charPtr            fieldName,                  // I:Field name/path (else
NULL)
                charPtr            action,                     // I:The script action
being invoked
                charPtr            script,                     // I:The script text
                anonPtr            dataPtr,                    // I:Type data pointer
                ET_CollectionHdl   aCollection,                // I:The collection handle
                ET_Offset          offset,                     // I:Collection element
reference
                int32              options,                    // I:Various logical
options
                ET_TypeID          fromWho,                    // I:Type ID, 0 for field
or unknown
                va_list            ap                          // I:va_list for additional
parameters
                                )
                                                               // R:0 for success, else
error #
{
    ET_UniqueID    uniqueID;
    TC_GetUniqueID(aCollection,0,offset,&uniqueID);
    TC_GetCStringFieldValue(aCollection,0,0,offset,name,sizeof(name) ,"name")
;
    elemTypeID. = TC_GetTypeID(aCollection,0,offset);
    TM_BreakUniqueID(uniqueID,&localID,&sys);
    if ( localID ) return 0;                                   // we've already got an
ID,we're done!
    scrubbedStrPtr = mangle name according to SQL name mangling algorithm
    force scrubbedStrPtr to upper case
    sprintf(filterText, kStartQueryBlock kRelationalDB ":upper(name) = '%s'"
                kEndQueryBlock, scrubbedStrptr);    // Create the filter
criteria
    hitList = construct hit list of matches
    count = # hits in hitList;                                 // how many hits did we get
    // Should issue a warning or dialog if more than one hit here
    if (hitList && hitList[0]._id)
    {
        uniqueID = TM_MakeUniqueID(hitList[0]._id,hitList[0]._system);
        existingElemTypeID = hitList[0]._type;
        exists = TRUE;
    }
    if (!uniqueID.id)
        uniqueID = TM_MakeUniqueID(DB_GetNextLocalUniqueID( ),0);
    if (!TC_HasDirtyFlags(aCollection, 0, 0, offset))
        call TC_EstablishEmptyDirtyState(aCollection,0,0,offset,NO) )
    TC_SetUniqueID(aCollection,0,offset,uniqueID);    // set the id
    return err;
}
```

This is a simple algorithm and merely queries the external RDBMS to determine if an item of the same name already exists and if so uses it, otherwise it creates a new ID and uses that. Suppose that the item involved is of type "Place". In this case, it would be helpful to be more careful when determining the unique ID because place names (such as cities) can be repeated all over the world (indeed there may be multiple cities or towns with the same within any given country). In this case, a more specific $UniqueID script could be registered with the type Place (the ancestral type of all places such as cities, towns, villages etc.) that might appear more like the algorithm given below:

```
static EngErr PTS_AssignPlaceUniqueID(          // $UniqueID script registered with Place
        ET_TypeDBHdl    aTypeDBHdl,             // I:Type DB handle (NULL to default)
        ET_TypeID       typeID,                 // I:Type ID
        charPtr         fieldName,              // I:Field name/path (else NULL)
        charPtr         action,                 // I:The script action being invoked
        charPtr         script,                 // I:The script text
        anonPtr         dataPtr,                // I:Type data pointer
        ET_CollectionHdl aCollection,           // I:The collection handle
        ET_Offset       offset,                 // I:Collection element reference
        int32           options,                // I:Various logical options
        ET_TypeID       fromWho,                // I:Type ID, 0 for field or unknown
        va_list         ap                      // I:va_list for additional parameters
        )                                       // R:0 for success, else error #
{
    ET_UniqueID    uniqueID;
    TC_GetUniqueID(aCollection,0,offset,&uniqueID);
    TC_GetCStringFieldValue(aCollection,0,0,offset,name,sizeof(name),"name");
    TC_GetCStringFieldValue(aCollection,0,0,offset,thisPlace,128,"placeType");
    TC_GetFieldValue(acollection,0,0,offset,&thisLon,"location.longitude");
    TC_GetFieldValue(aCollection,0,0,offset,&thisLat,"location.latitude");
    elemTypeID = TC_GetTypeID(aCollection,0,offset);
    pT = TM_IsTypeProxy(elemTypeID);
    if ( pT ) elemTypeID = pT;
    TM_BreakuniqueID(uniqueID,&localID,NULL);
    if ( localID ) return 0;                    // we've already got an ID,we're done!
    scrubbedStrPtr = mangle name according to SQL name mangling algorithm
    force scrubbedStrPtr to upper case
    sprintf(filterText, kStartQueryBlock kRelationalDB ":upper(name) = '%s'"
                       kEndQueryBlock, scrubbedStrPtr);
    sprintf(fieldList,"placeType,location,country");
    tmpCollection = fetch all matching items to a collection
    TC_Count(tmpCollection,kValuedNodesOnly,rootElem,&count);
    // if we got one or more we need further study to see if it is in fact this place
    // a place is unique if the place type, latitude and longitude are the same
    placeTypeId = TM_KeyTypeToTypeID('PLCE',NULL);
    pplaceTypeId = TM_KeyTypeToTypeID('POPP',NULL);
    if (count)
    {
        anElem =0;
        while (tmpCollection && TC_Visit(tmpCollection,kRecursiveOperation +
                                kValuedNodesonly,0,&anElem,false))
        {
            if ( TM_TypesAreCompatible(NULL, TC_GetTypeID( tmpCollection, 0, anElem)
                        ,pplaceTypeId) && TM_TypesAreCompatible(NULL,elemTypeID,pplaceTypeId) )
            {                                   // both populated places, check country
                TC_GetFieldValue(tmpCollection,0,0,anElem,&prf1,"country");
                TC_GetFieldValue(aCollection,0,0,offset,&prf2,"country");
                if (strcmp(prf1.name,prf2.name) )    // different country!
                    continue;
            TC_GetCStringFieldValue(tmpCollection,0,0,anElem,&placeType,128,"placeType");
            if (!strcmp(thisPlace,placeType) )   // same type
            {
                if (
```

-continued

```
TC_IsFieldEmpty(tmpCollection,0,0,anElem,"location.longitude") )
                    {                               // this is the same place!
                        TC_GetuniqueID(tmpCollection,0,anElem,&uniqueID);
                        TM_BreakUniqueID(uniqueID,&localID,NULL);
                        existingElemTypeID =
TC_GetTypeID(tmpCollection,0,anElem);
                        exists = (existingElemTypeID != 0);
                        break;
                    } else
                    {
                        TC_GetFieldValue(tmpCollection, 0, 0, anElem, &longitude,
                                "location.longitude");
                        if (ABS(thisLon - longitude) < 0.01)
                        {                           // at similar longitude
                            TC_GetFieldValue(tmpCollection, 0,0, anElem,
&latitude,
                                        "location.latitude");
                            if (ABS(thisLat - latitude) < 0.01)
                            {                       // and similar latitude!
                                TC_GetUniqueID(tmpCollection,0,anElem,&unigueID);
                                TM_BreakUniqueID(uniqueID,&localID,NULL);
                                existingElemTypeID =
TC_GetTypeID(tmpCollection,0,anElem);
                                exists = (existingElemTypeID != 0);
                                break;
                            }
                        }
                    }
                }
            }
        }
    }
    if ( !localID )
        uniqueID = TM_MakeUniqueID(DB_GetNextLocalUniqueID( ),0);
    else
        uniqueID = TM_MakeUniqueID(localID,0);
    if (!TC_HasDirtyFlags(aCollection, 0, 0, offset))
        call TC_EstablishEmptyDirtyState(aCollection,0,0,offset,NO) )
    TC_SetUniqueID(aCollection,0,offset,uniqueID);       // set the id
    return err;
}
```

This more sophisticated algorithm for determining place unique IDs attempts to compare the country fields of the Place with known places of the same name. If this does not distinguish the places, the algorithm then compares the place type, latitude and longitude, to further discriminate. Obviously many other strategies are possible and completely customizable within this framework and this example is provided for illustration purposes only. The algorithm for a person name, for example, would be completely different, perhaps based on age, address, employer and many other factors.

It is clear from the discussion above that a query-building interface can be constructed that through knowledge of the types hierarchy (ontology) alone, together with registration of the necessary plug-ins by the various containers, can generate the UI portions necessary to express the queries that are supported by that plug-in. A generic query-building interface, therefore, need only list the fields of the type selected for query and, once a given field is chosen as part of a query, it can display the UI necessary to specify the query. Thereafter, using plug-in functions, the query-building interface can generate the necessary query in the native language of the container involved for that field.

Figure 2:
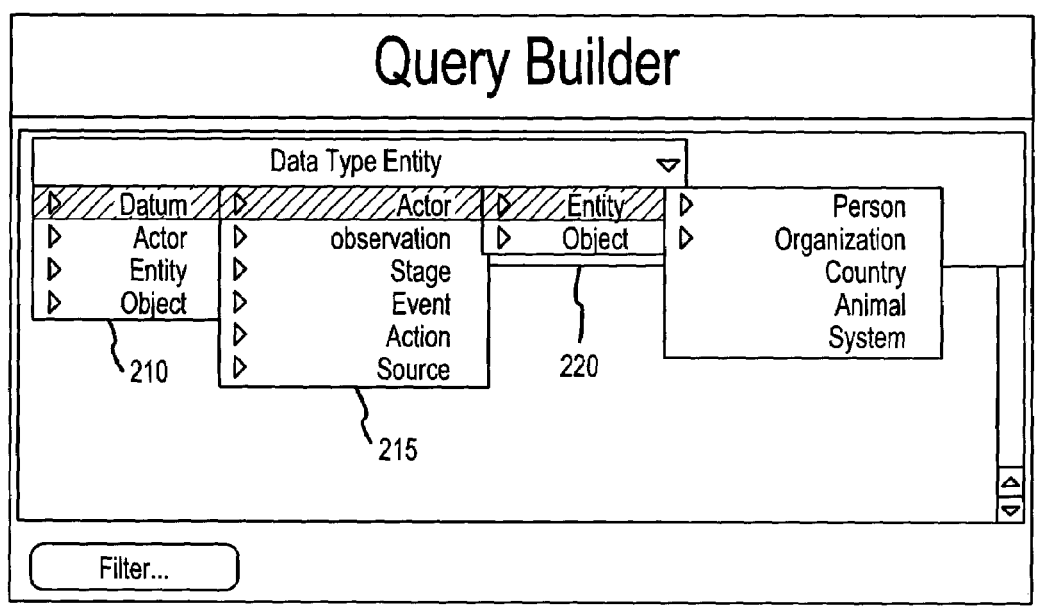
FIG. 2 shows a sample query-building user interface (UI).

Referring now to FIG. 2, a sample query-building user interface (UI) is shown. In this sample, the user is in the process of choosing the ontological type that he wishes to query. Note that the top few levels of one possible ontological hierarchy 210, 215, 220 are visible in the menus as the user makes his selection. A sample ontology is discussed in more detail below. The UI shown is one of many possibly querying interfaces and indeed is not that used in the preferred embodiment but has been chosen because it clearly illustrates the connections between containers and queries.

Figure 3:
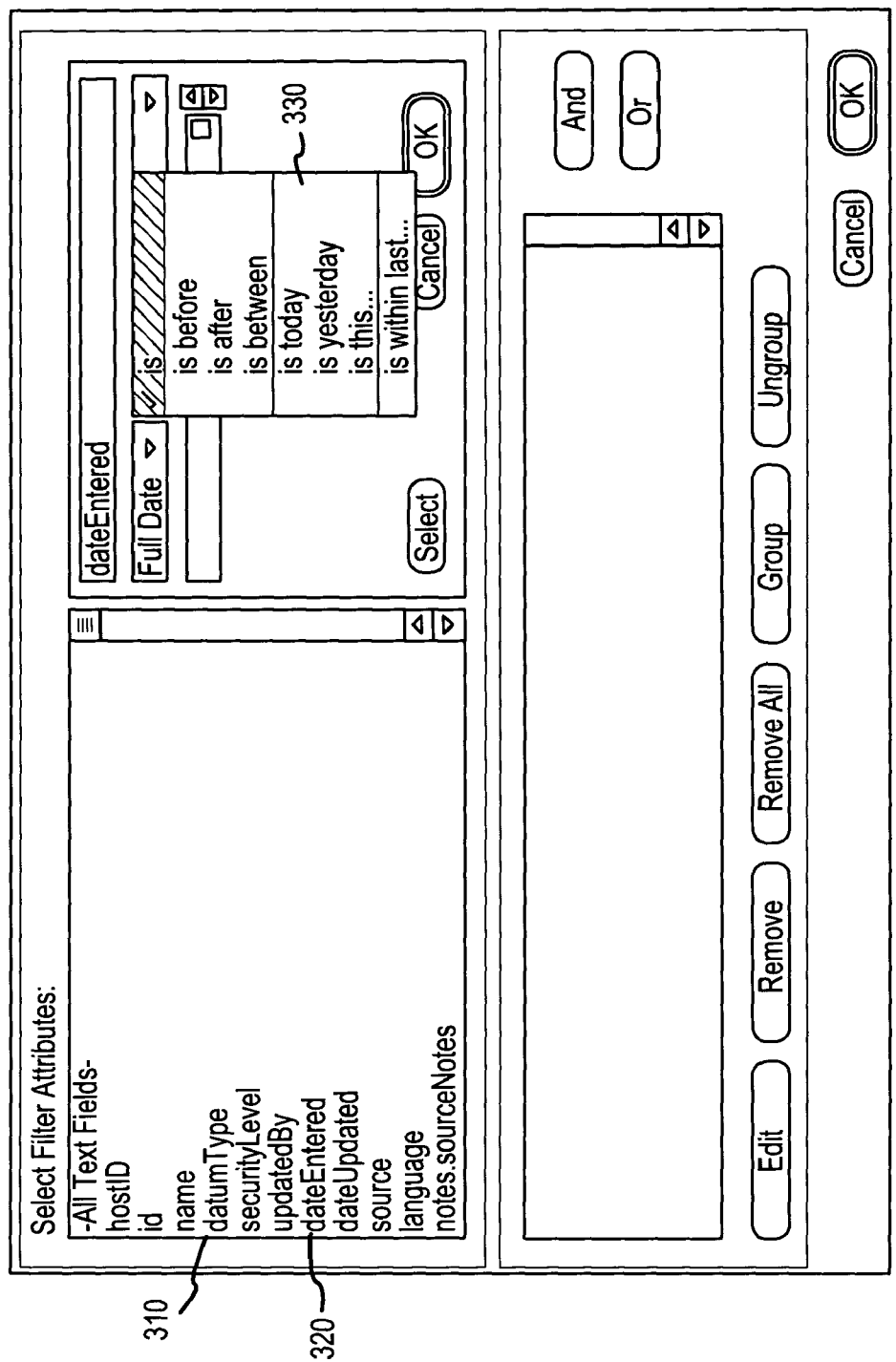
FIG. 3 shows a sample user interface providing access to the fields within the type "country."

Referring now to FIG. 3, a sample user interface providing access to the fields within the type "country" is shown. Having selected Country from the query-building UI illustrated in FIG. 2, the user may then chose any of the fields of the type country 310 on which he wishes to query. In this example, the user has picked the field 'dateEntered' 320 which is a field that was inherited by Country from the base persistent type Datum. Once the field 320 has been selected, the querying interface can determine which member of the container federation is responsible for handling that field (not shown). Through registered plug-in functions, the querying language can determine the querying operations supported for that type. In this case, since the field is a date (which, in this example, is handled by the RDBMS container), the querying environment can determine that the available query operations 330 are those appropriate to a date.

Figure 4:
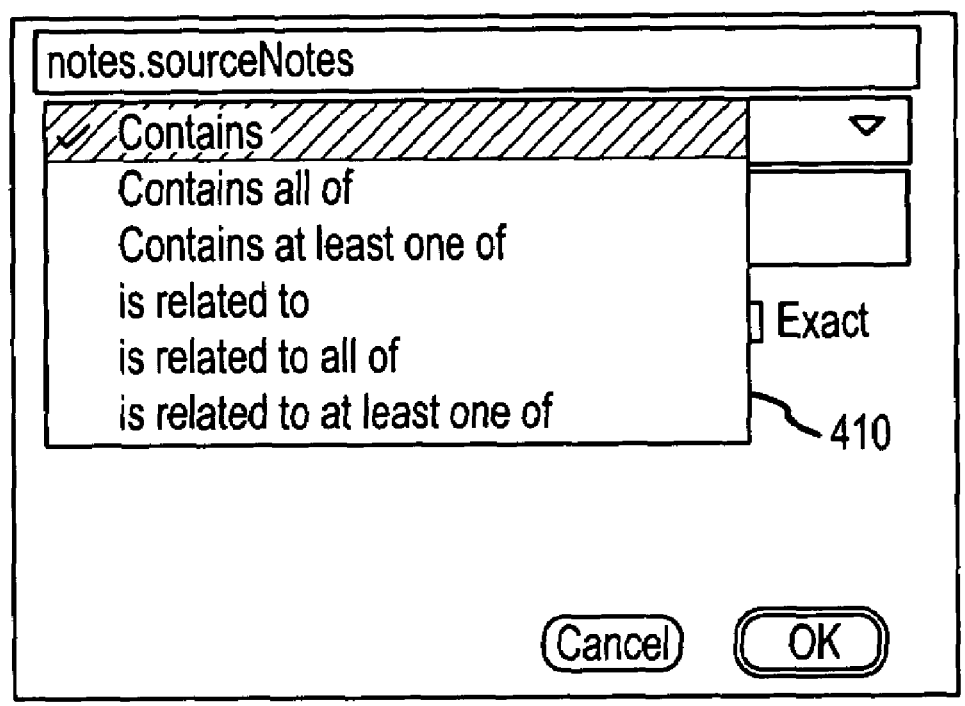
FIG. 4 shows a sample user interface providing access to a free format text field within the type "country."

Referring now to FIG. 4, a sample user interface providing access to a free format text field within the type "country" is shown. In this figure, the user has chosen a field supported by the inverted text file container. Specifically, the field "notes.sourceNotes" has been chosen (which again is inherited from Datum) and thus the available querying operators 410 (as registered by the text container) are those that are more appropriate to querying a free format text field.

Figure 5:
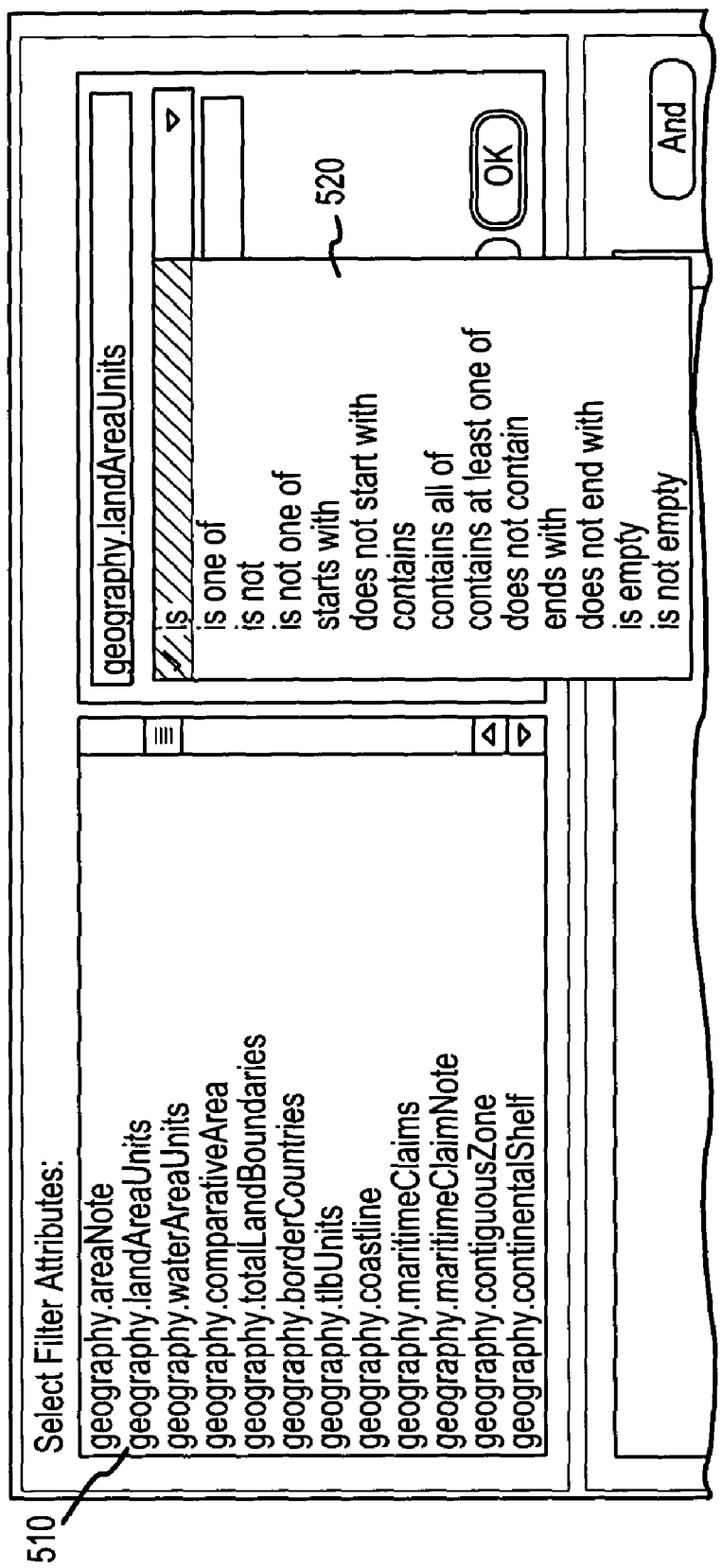
FIG. 5 shows a sample user interface providing access to a fixed sized text field within the type "country."

Referring now to FIG. 5, a sample user interface providing access to a fixed sized text field within the type "country" is shown. In this figure, the user has chosen the field "geography.landAreaUnits" 510, which is a fixed sized text field of Country. Again, in the above illustration, this field is supported by the RDBMS container so the UI displays the querying operations 520 normally associated with text queries in a relational database.

The above discussion illustrated how container specific storage could be created from the ontology, how to query and retrieve data from individual containers in the federation, and how the user interface and the queries themselves can be generated directly from the ontology specification without requiring custom code (other than an application independent set of container plug-ins). The other aspects necessary to create a completely abstracted federated container environment relate to three issues: 1) how to distribute queries between the containers, 2) how to determine what queries are possible, and 3) how to reassemble query results returned from individual containers back into a complete record within a collection as defined by the ontology. The portion of the system of this invention that relates to defining individual containers, the querying languages that are native to them, and how to construct (both in UI terms and in functional terms) correct and meaningful queries to be sent to these containers, is hereinafter known as MitoQuest. The portion of the system that relates to distributing (federating) queries to various containers and combining the results from those containers into a single unified whole, is hereinafter known as MitoPlex. The federated querying system of this invention thus adopts a two-layer approach: the lower layer (MitoQuest) relates to container specific querying, the upper layer (MitoPlex) relates to distributing queries between containers and re-combining the results returned by them. Each will be described further below (in addition to the patent application referenced herein).

Each container, as a result of a container specify query, constructs and returns a hit-list of results that indicate exactly which items match the container specific query given. Hit lists are zero terminated lists that, in this example, are constructed from the type ET_Hit, which is defined as follows:

```
typedef struct ET_Hit        // list of query hits returned by a server
{
    OSType      _system;     // system tag
    unsInt64    _id;         // local uniqute item ID
    ET_TypeID   _type;       // type ID
    int32       _relevance;  // relevance value 0..100
} ET_Hit;
```

As can be seen, an individual hit specifies not only the globally unique ID of the item that matched, but also the specific type involved and the relevance of the hit to the query. The specific type involved may be a descendant of the type queried since any query applied to a type is automatically applied to all its descendants since the descendants "inherit" every field of the type specified and thus can support the query given. In this embodiment, relevance is encoded as an integer number between 0 and 100 (i.e., a percentage) and its computation is a container specific matter. For example, this could be calculated by plug-in functions within the server(s) associated with the container. It should be noted that the type ET_Hit is also the parent type of all proxy types (as further discussed in the Types Patent Application) meaning that all proxy types contain sufficient information to obtain the full set of item data if required.

When constructing a multi-container query in MitoPlex, the individual results (hit lists) are combined and re-assembled via the standard logical operators as follows:

AND—For a hit to be valid, it must occur in the hit list for the container specific query occurring before the AND operator and also in the hit list for the container specific query that follows the AND.

OR—For a hit to be valid, it must occur in either the hit list before the operator, or the one after the operator (or both).

AND THEN—This operator has the same net effect as the AND operator but the hit-list from before the operator is passed to the container executing the query that follows the operator along with the query itself. This allows the second container to locally perform any pruning implied by the hit list passed before returning its results. This operator therefore allows control over the order of execution of queries and allows explicit optimization of performance based on anticipated results. For example if one specified a mixed container query of the form "[RDBMS:date is today] AND THEN [TEXT:text contains "military"]" it is clear that the final query can be performed far quicker than the effect of performing the two queries separately and then recombining the results since the first query pre-prunes the results to only those occurring on a single day and since the system may contain millions of distinct items where the text contains "military". For obvious reasons, this approach is considerably more efficient.

AND {THEN} NOT—This operator implies that to remain valid, a hit must occur in the hit-list for the query specified before the operator but not in the hit-list for the query after the operator.

Additional logical operators allow one to specify the maximum number of hits to be returned, the required relevance for a bit to be considered, and many other parameters could also be formulated. As can be seen, the basic operations involved in the query combination process involve logical pruning operations between hit lists resulting from MitoQuest queries. Some of the functions provided to support these processes may be exported via a public API as follows:

```
Boolean DB_NextMatchInHitList (            // Obtain the next match in
a hit list
                ET_Hit*     aMatchValue,   // I:Hit value to match
                ET_HitList  *aHitList,     // IO:Pointer into hit list
                int32       options        // I: options as for
DB_PruneHitList( )
                            );             // R:TRUE if match
found, else FALSE
```

-continued

```
Boolean DB_BelongsInHitList    (                      // Should hit be added to a
hit list?
                ET_Bit*        aHit,                  // I:Candidate hit
                ET_HitList     aPruneList,            // I:Pruning hit list, zero
ID term.
                int32          options                // I:pruning options word
                );                                    // R:TRUE to add hit, FALSE
otherwise
ET_HitList DB_PruneHitList     (                      // prunes two hit lists
                ET_HitList     aHitList,              // I:Input hit list, zero
ID terminated
                ET_HitList     aPruneList,            // I:Pruning hit list, zero
ID term.
                int32          options,               // I:pruning options word
                int32          maxHits                // I:Maximum # hits to
return (or 0)
                );                                    // R:Resultant hit list, 0
ID term.
```

In the code above, the function DB_NextMatchInHitList ( ) would return the next match according to specified sorting criteria within the hit list given. The matching options are identical to those for DB_PruneHitList( ). The function DB_BelongsInHitList( ) can be used to determine if a given candidate hit should be added to a hit list being built up according to the specified pruning options. This function may be used in cases where the search engine returns partial hit sets in order to avoid creating unnecessarily large hit lists only to have them later pruned. The function DB_PruneHitList( ) can be used to prune/combine two hit lists according to the specified pruning options. Note that by exchanging the list that is passed as the first parameter and the list that is passed as the second parameter, it is possible to obtain all possible behaviors implied by legal combinations of the MitoPlex AND, OR, and NOT operators. Either or both input hit lists may be NULL which means that this routine can be used to simply limit the maximum number of hits in a hit list or alternatively to simply sort it. In the preferred embodiment, the following pruning options are provided:

| | |
|---|---|
| kLimitToPruneList | limit returned hits to those in prune list (same as MitoPlex AND) |
| kExclusiveOfPruneList | remove prune list from 'hits' found (same as MitoPlex AND NOT) |
| kCombineWithPruneList | add the two hit lists together (default-same as MitoPlex OR) |

The following options can be used to control sorting of the resultant hit list:

| | |
|---|---|
| kSortByTypeID | sort resultant hit list by type ID |
| kSortByUniqueID | sort resultant hit list by unique ID |
| kSortByRelevance | sort resultant hit list by relevance |
| kSortInIncreasingOrder | Sort in increasing order |

In addition to performing these logical operations on hit lists, MitoPlex supports the specification of registered named MitoQuest functions in place of explicit MitoQuest queries. For example, if the container on one side of an operator indicates that it can execute the named function on the other side, then the MitoPlex layer, instead of separately launching the named function and then combining results, can pass it to the container involved in the other query so that it may be evaluated locally. The use of these 'server-based' multi-container queries is extremely useful in tuning system performance. In the preferred embodiment of the system based on this invention, virtually all containers can locally support interpretation of any query designed for every other container (since they are all implemented on the same substrate) and thus all queries can be executed in parallel with maximum efficiency and with pruning occurring in-line within the container query process. This approach completely eliminates any overhead from the federation process. Further details of this technique are discussed in related patent applications that have been incorporated herein.

It is clear from the discussion above that the distribution of compound multi-container queries to the members of the container federation is a relatively simple process of identifying the containers involved and launching each of the queries in parallel to the server(s) that will execute it. Another optimization approach taken by the MitoPlex layer is to identify whether two distinct MitoQuest queries involved in a full MitoPlex query relate to the same container. In such a case, the system identifies the logic connecting the results from each of these queries (via the AND, OR, NOT etc. operators that connect them) and then attempts to re-formulate the query into another form that allows the logical combinations to instead be performed at each container. In the preferred embodiment, the system performs this step by combining the separate queries for that container into a single larger query combined by a container supplied logical operator. The hit-list combination logic in the MitoPlex layer is then altered to reflect the logical re-arrangements that have occurred. Once again, all this behavior is possible by abstract logic in the MitoPlex layer that has no specific dependency on any given registered container but is simply able to perform these manipulations by virtue of the plug-in functions registered for each container. These registered plug-in functions inform the MitoPlex and MitoQuest layers what functionality the container can support and how to invoke it. This approach is therefore completely open-ended and customizable to any set of containers and the functionality they support. Examples of other container functionality might be an image server that supports such querying behaviors as 'looks like', a sound/speech server with querying operations such as 'sounds like', a map server with standard GIS operations, etc. All of these can be integrated and queried in a coordinated manner through the system described herein.

Figures 6A, 6B:
FIG. 6A shows an example of how a short text field or numeric field (such as those handled by the RDBMS container described above) might be displayed in a control group.
FIG. 6B shows one method for displaying a date in a control group.

The next issue to address is the manner in which the present invention auto-generates and handles the user interface necessary to display and interact with the information defined in the ontology. At the lowest level, all compound structures eventually resolve into a set of simple building-block types that are supported by the underlying machine architecture. The same is true of any type defined as part of an ontology and so the first requirement for auto-generating user interface based on ontological specifications is a GUI framework with a set of 'controls' that can be used to represent the various low level building blocks. This is not difficult to achieve with any modern GUI framework. The following images and descriptive text illustrate just one possible set of such basic building blocks and how they map to the low level type utilized within the ontology:

Referring now to FIG. 6A, an example of how a short text field or numeric field (such as those handled by the RDBMS container described above) might be displayed in a control group.

Figure 6C:
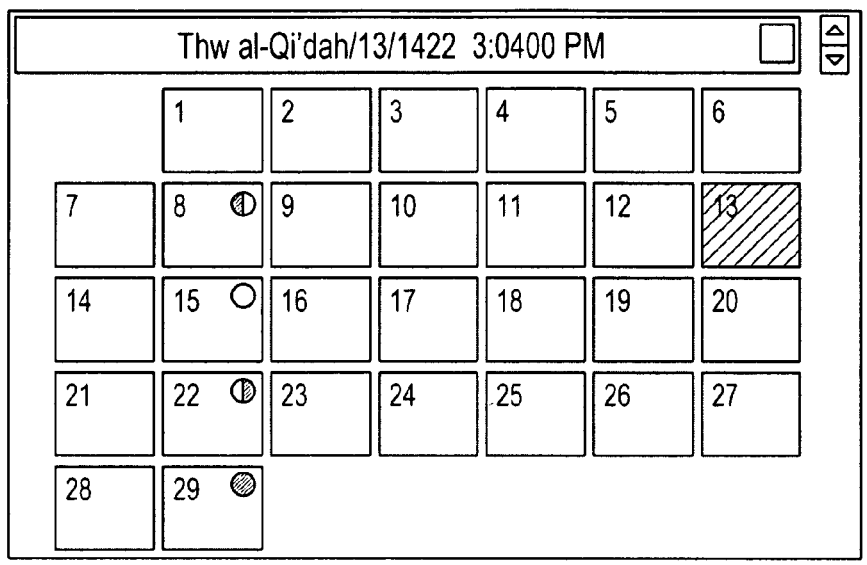
FIG. 6C shows an example of an Islamic Hijjrah calendar being displayed.

Referring now to FIG. 6B, one method for displaying a date in a control group is shown. In this Figure, the date is actually being shown in a control that is capable of displaying dates in multiple calendar systems. For example, the circle shown on the control could be displayed in yellow to indicate the current calendar is Gregorian. Referring now to FIG. 6C, an example of an Islamic Hijjrah calendar being displayed is provided. The UI layout can be chosen to include the calendar display option, for example.

Figure 7A:
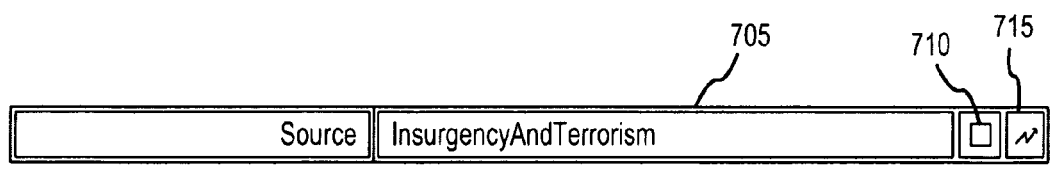
FIG. 7A shows the illustrated control group of how one might display and interact with a persistent reference field ('#').

Referring now to FIG. 7A, the illustrated control group is an example of how one might display and interact with a persistent reference field ('#'). The text portion 705 of the grouping displays the name field of the reference, in this case 'InsuregencyAndTerrorism', while the list icon 710 allows the user to pop up a menu of the available values (see the 'members' field discussion under ET_PersistentRefabove), and the jagged arrow icon 715 allows the user to immediately navigate to (hyperlink to) the item being referenced.

Referring now to FIG. 7B, 7B provides an example of one way that a collection reference field ('@@') might be displayed in an auto-generated user interface. In this case the field involved is the 'related' field within the notes field of Datum. Note also that the collection in this case is hierarchical and that the data has been organized and can be navigated according to the ontology.

Figure 8:
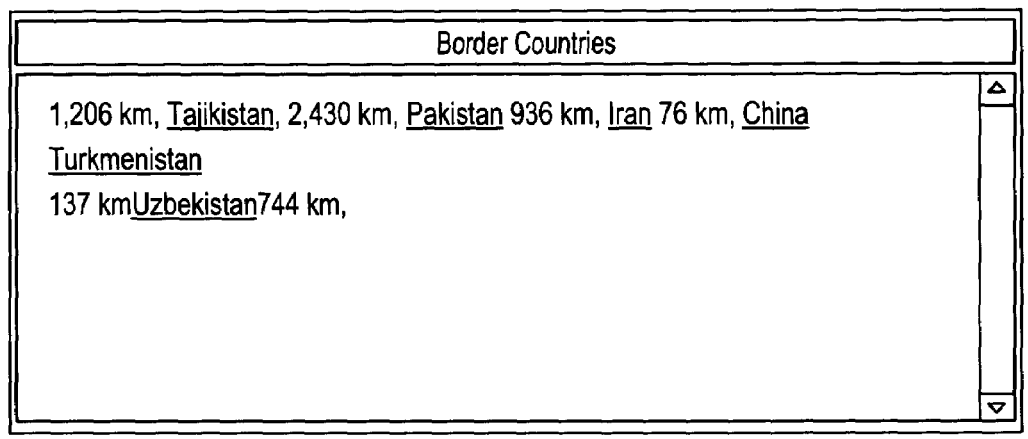
FIG. 8 shows one possible method for displaying variable sized text fields (referenced via the char @ construct).

Referring now to FIG. 8, one possible method for displaying variable sized text fields (referenced via the char @ construct) is shown. Note that in this example, automatic UI hyperlink generation has been turned on and thus any known item within the text (in this case the names of the countries) is automatically hyperlinked and can be used for navigation simply by clicking on it (illustrated as an underline). This hyper linking capability will be discussed further in later patents but the display for that capability may be implemented in any number of ways, including the manner in which hyperlinks are displayed by web browsers.

Figure 9:
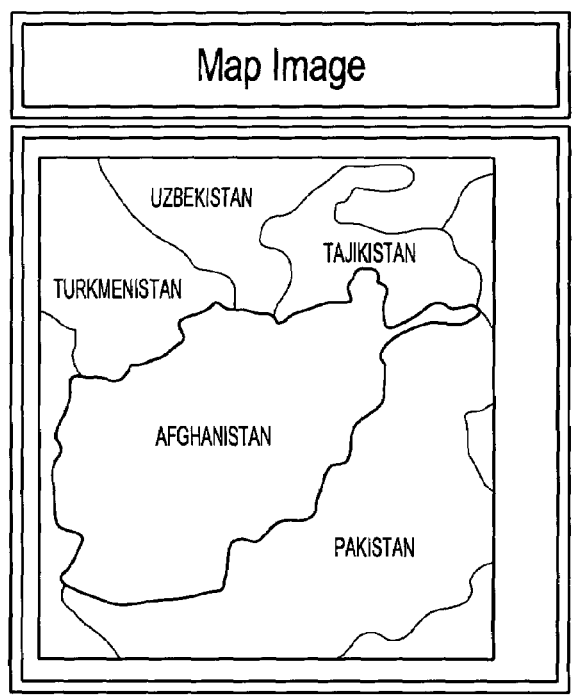
FIG. 9 shows the manner in which an image reference (Picture @picture) field could be displayed in an auto-generated user interface.

Referring now to FIG. 9, this figure illustrates the manner in which an image reference (Picture @picture) field could be displayed in an auto-generated user interface.

Many other basic building blocks are possible and each can of course be registered with the system via plug-ins in a manner very similar to that described above. In all cases, the human-readable label associated with the control group is generated automatically from the field name with which the control group is associated by use of the function TM_CleanFieldName( ) described in the Types Patent Application. Because the system code that is generating and handling the user interface in this manner has full knowledge of the type being displayed and can access the data associated with all fields within using the APIs described previously, it is clear how it is also possible to automatically generate a user interface that is capable of displaying and allowing data entry of all types and fields defined in the ontology. The only drawback is the fact that user interfaces laid out in this manner may not always look 'professional' because more information is required in order to group and arrange the layout of the various elements in a way that makes sense to the user and is organized logically. The system of this invention overcomes this limitation by extracting the necessary additional information from the ontological type definition itself. To illustrate this behavior, a listing is provided in Appendix A that gives the pseudo-code ontological type definition for the type Country (which inherits from Entity and thereby from Datum described above) in the example ontology.

As can be seem from the listing above, the ontology creator has chosen to break down the many fields of information available for a country into a set of introductory fields followed by number of top-level sub-structures as follows:

| | |
|---|---|
| geography | Information relating to the country's geography |
| people | Information relating to the country's people |
| government | Information relating to the country's government |
| economy | Information about the country's economy |
| communications | Information on communications capabilities |
| transport | Transport related information |
| military | Information about the country's military forces |
| medical | Medical information |
| education | Education related information |
| issues | Current and past issues for the country involved |

Because the code that generates the UI has access to this information, it can match the logical grouping made in the ontology.

Figure 10:
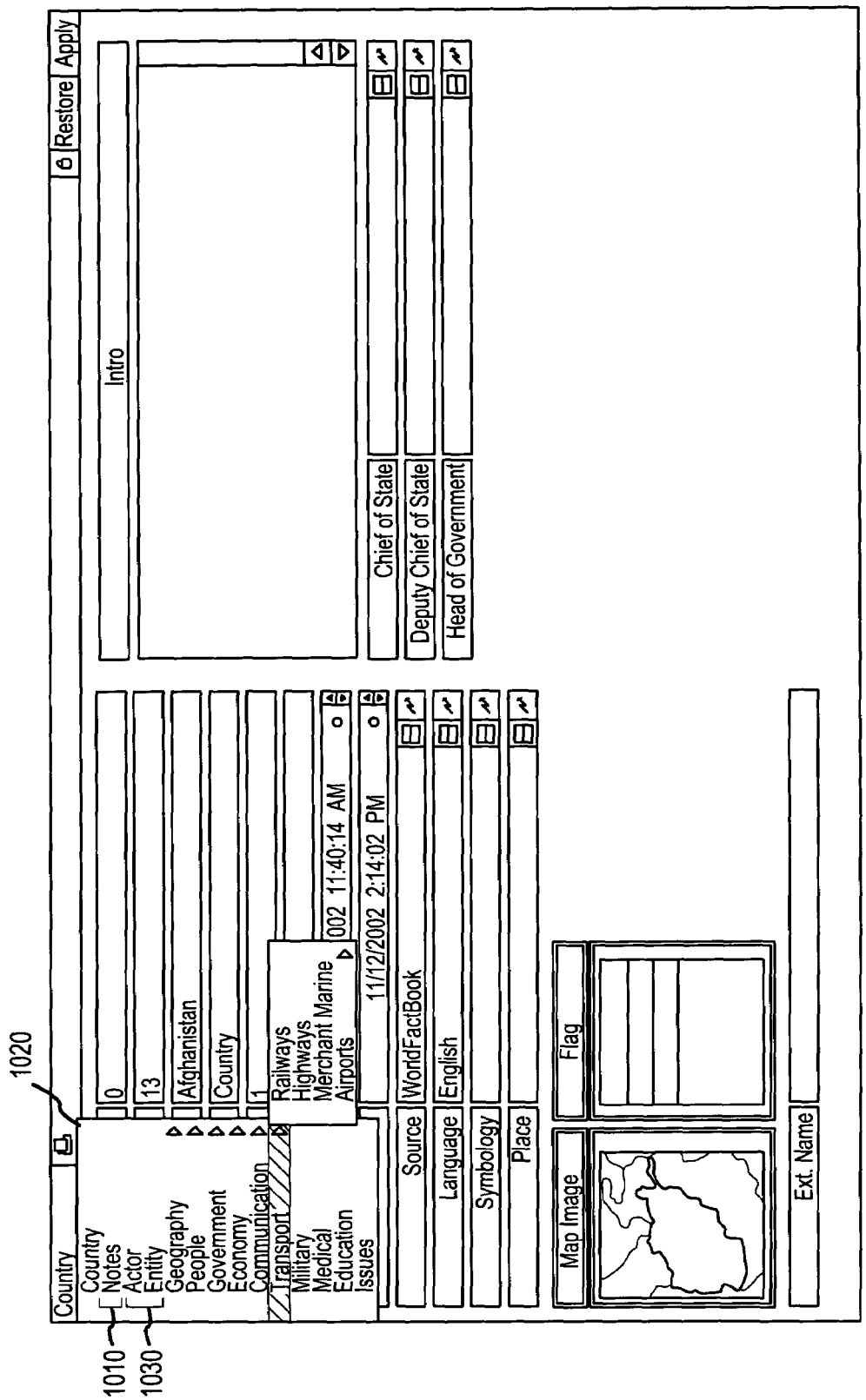
FIG. 10 shows a sample screen shot of one possible display of the Country record in the same UI layout theme described above (most data omitted).

Referring now to FIG. 10, a sample screen shot of one possible display of the Country record in the same UI layout theme described above (most data omitted) is provided. In the illustrated layout the first page of the country display shows the initial fields given for country in addition to the basic fields inherited from the outermost level of the Datum definition. The user is in the process of pulling down the 'page' navigation menu 1020 which has been dynamically built to match the ontology definition for Country given above. In addition, this menu contains entries 1010 for the notes sub-field within Datum (the ancestral type) as well as entries for the fields 1030 that country inherits from its other ancestral types. In the first page, the UI layout algorithm in this example has organized the fields as two columns in order to make best use of the space available given the fields to be displayed. Since UI layout is registered with the environment, it is possible to have many different layout strategies and appearances (known as themes) and these things are configurable for each user according to user preferences.

Figure 11:
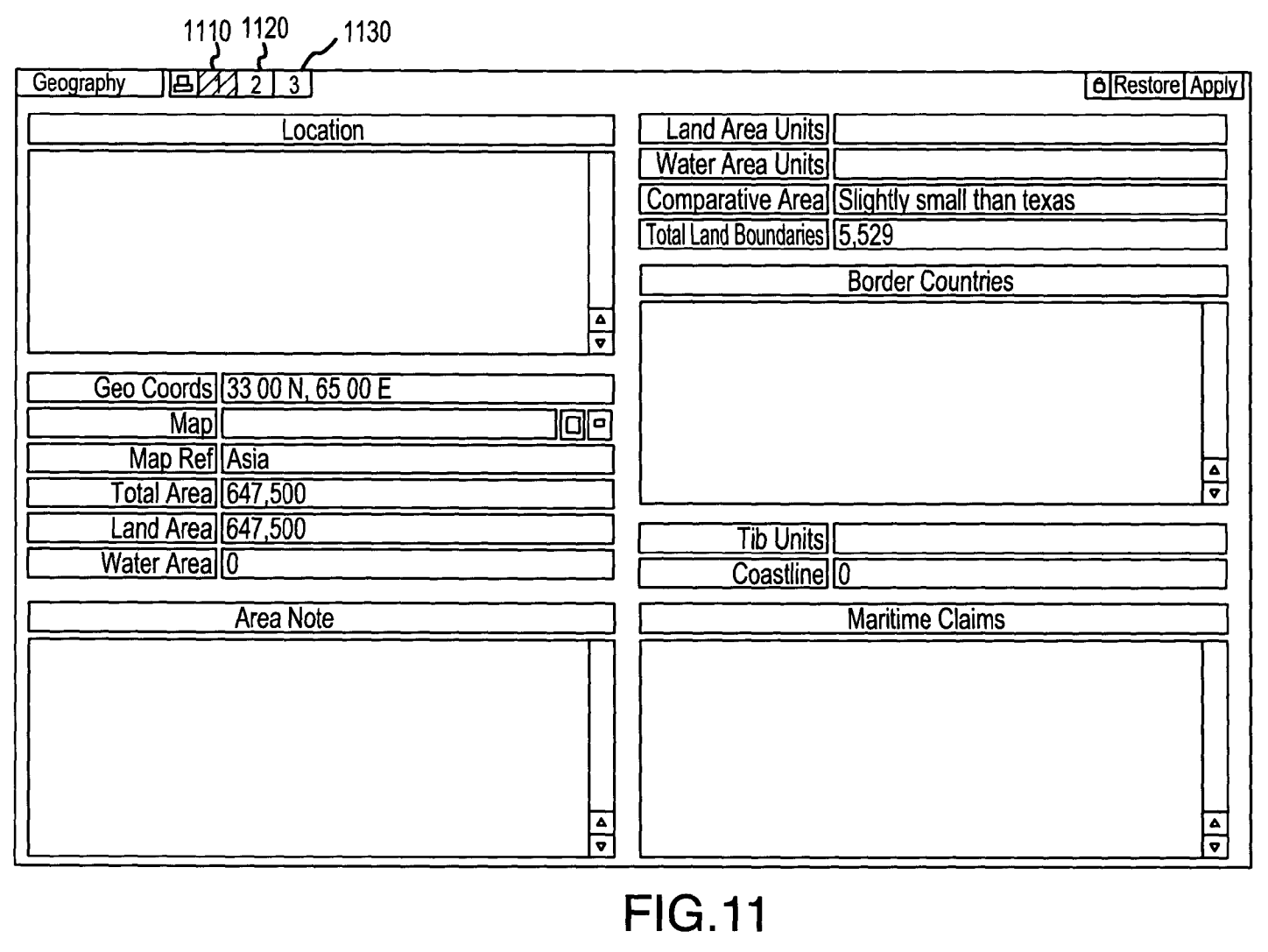

Referring now to FIG. 11, a sample embodiment of the geography page within Country is shown. Presumably, the user has reached this page using the page navigation menu 1020 described above. In this case, the UI does not have sufficient space to display all fields of geography on a single page, so for this theme it has chosen to provide numbered page navigation buttons 1110, 1120, 1130 to allow the user to select the remaining portions of the geography structure content. Once again, different themes can use different strategies to handle this issue. The theme actually being shown in this example is a Macintosh OS-9 appearance and the layout algorithms associated with this theme are relatively primitive compared to others.

Figure 12:
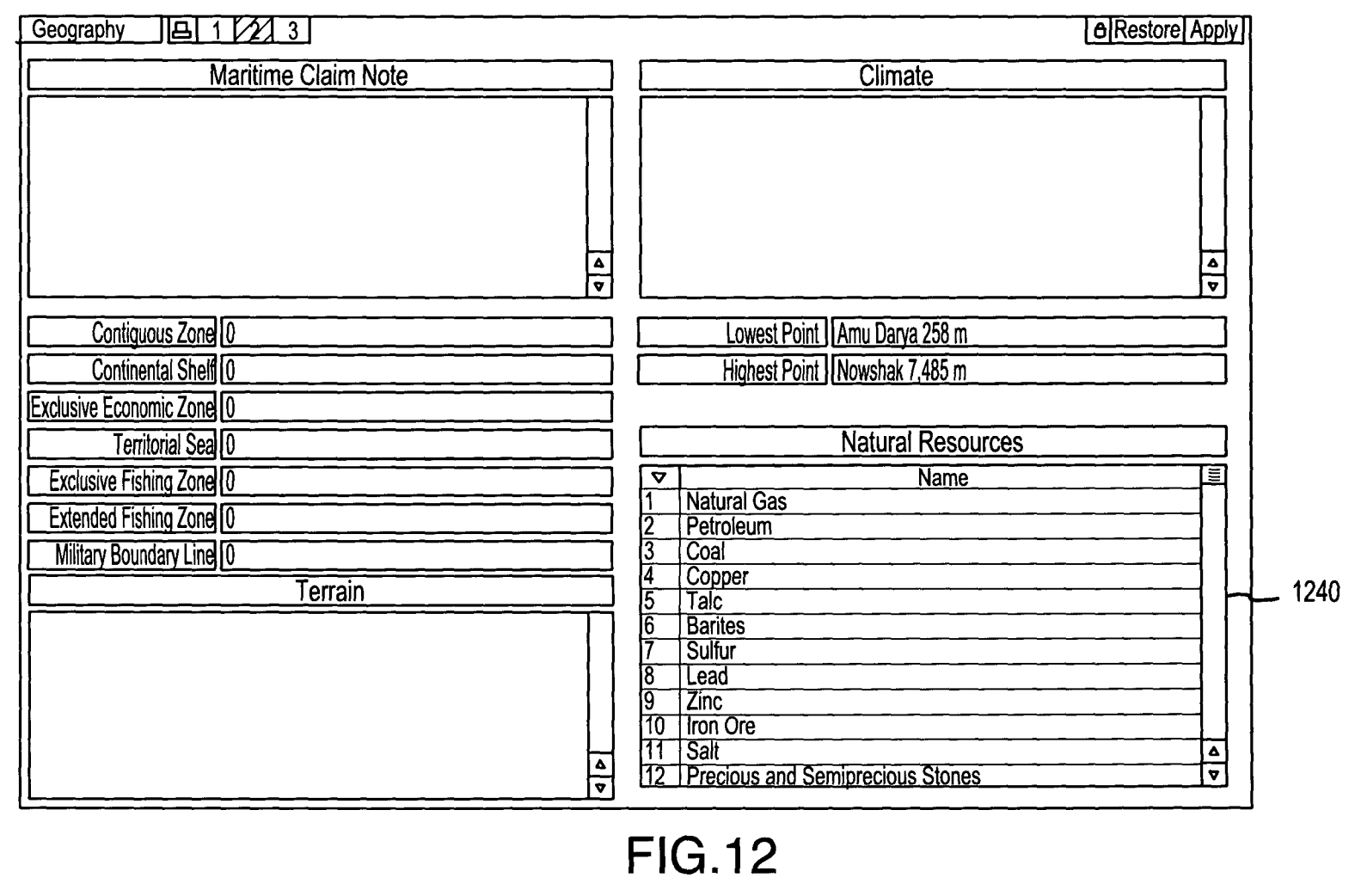

Referring now to FIG. 12, a sample embodiment of the second sub-page of the geography page within country is shown. As shown, the natural resources collection field 1240 is displayed as a navigable list within which the user may immediately navigate to the item displayed simply by double-clicking on the relevant list row. More advanced themes in the system of this invention take additional measures to make better use of the available space and to improve the appearance of the user interface. For example, the size of the fields used to display variable sized text may be adjusted so that the fields are just large enough to hold the amount of text present for any given record. This avoids the large areas of white space that can be seen in FIG. 12 and gives the appearance of a custom UI for each and every record displayed. As the window itself is resized, the UI layout is re-computed dynamically and a new appearance is established on-the-fly to make best use of the new window dimensions. Other tactics include varying the number of columns on each page depending on the information to be displayed, packing small numeric fields two to a column, use of disclosure tabs compact content and have it pop-up as the mouse moves over the tab concerned, etc. The possibilities are limited only by the imagination of the person registering the plug-ins. To achieve this flexibility, the UI layout essentially treats each field to be displayed as a variable sized rectangle that through a standard interface can negotiate to change size, move position or re-group itself within the UI. The code of the UI layout module allows all the UI components to compete for available UI space with the result being the final layout for a given ontological item. Clearly the matter of handling user entry into fields and its updating to persistent storage is relatively straightforward given the complete knowledge of the field context and the environment that is available in this system.

Figure 13:
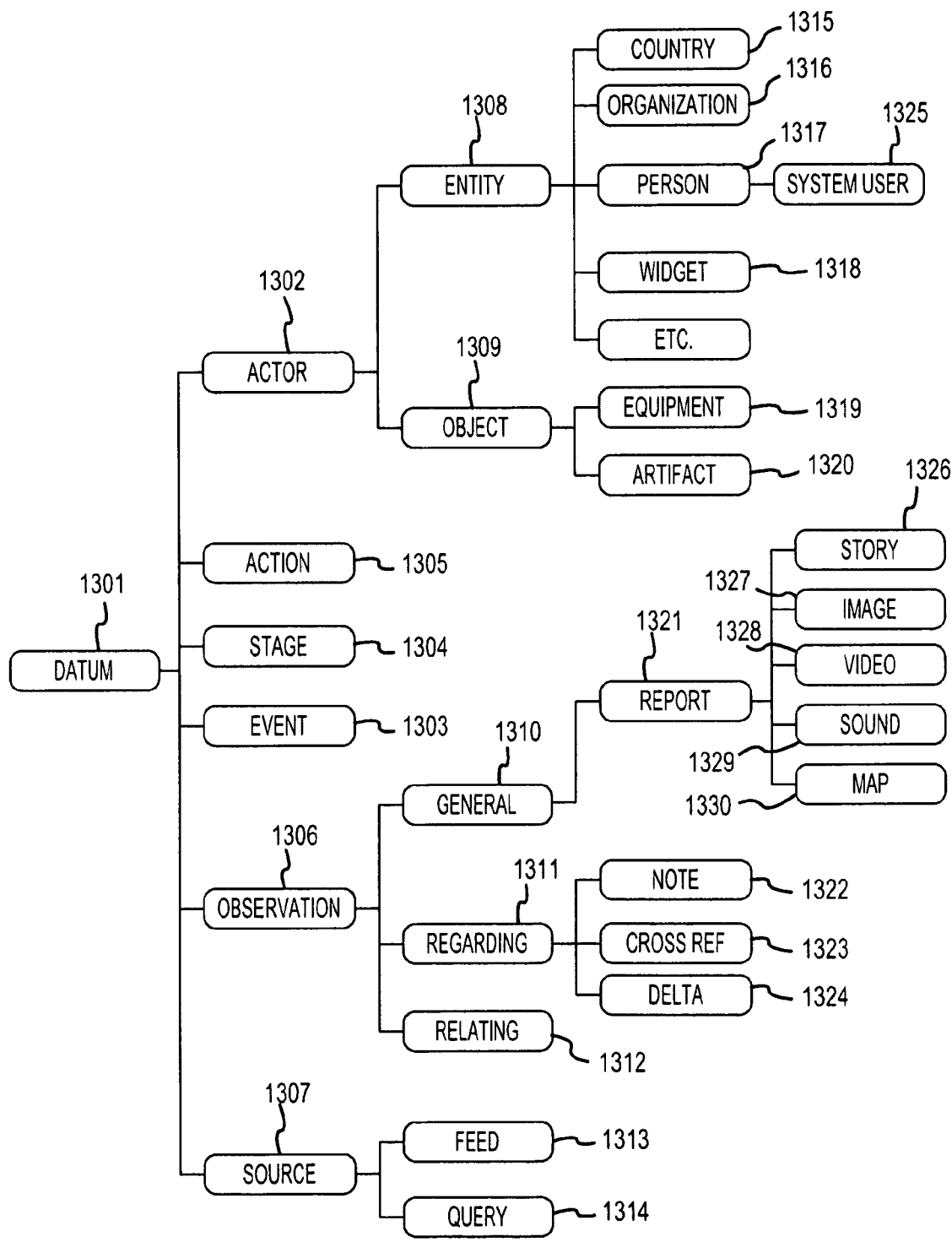
FIG. 13 shows an example of one part of a high-level ontology targeted at intelligence is shown.

Referring now to FIG. 13, an example of one part of a high-level ontology targeted at intelligence is shown. This ontology has been chosen to facilitate the extraction of meaning from world events; it does not necessarily correspond to any functional, physical or logical breakdown chosen for other purposes. This is only an example and in no way is such ontology mandated by the system of this invention. Indeed, the very ability of the system to dynamically adapt to any user-defined ontology is one of the key benefits of the present invention. The example is given only to put some of the concepts discussed previously in context, and to illustrate the power of the ontological approach in achieving data organization for the purposes of extracting meaning and knowledge. For simplicity, much detail has been omitted. The key to developing an efficient ontology is to categorize things according to the semantics associated with a given type. Computability must be independent of any concept of a 'database' and thus it is essential that these types automatically drive (and conceal) the structure of any relational or other databases used to contain the fields described. In this way, the types can be used by any and all code without direct reliance on or knowledge of a particular implementation.

Datum 1301—the ancestral type of all persistent storage.

Actor 1302—actors 1302 participate in events 1303, perform actions 1305 on stages 1304 and can be observed 1306.

Entity 1308—Any 'unique' actor 1302 that has motives and/or behaviors, i.e., that is not passive Country 1315—a country 1315 is a unique kind of meta-organization with semantics of its own, in particular it defines the top level stage 1304 within which events 1303 occur (stages 1304 may of course be nested)

Organization 1316—an organization 1316 (probably hierarchical)

Person 1317—a person 3117

SystemUser 1325—a person 1317 who is a user of the system

Widget 1318—an executable item (someone put it there for a purpose/motive!)

Object 1309—A passive non-unique actor 1302, i.e., a thing with no inherent drives or motives Equipment 1319—An object 1309 that performs some useful function that can be described and which by so doing increases the range of actions 1305 available to an Entity 1308.

Artifact 1320—An object 1309 that has no significant utility, but is nonetheless of value for some purpose.

Stage 1304—This is the platform or environment where events 1303 occur, often a physical location. Stages 1304 are more that just a place. The nature and history of a stage 1304 determines to a large extent the behavior and actions 1305 of the Actors 1302 within it. What makes sense in one stage 1304 may not make sense in another.

Action—actions 1305 are the forces that Actors 1302 exert on each other during an event 1303. All actions 1305 act to move the actor(s) 1302 involved within a multi-dimensional space whose axes are the various motivations that an Entity 1308 can have (greed, power, etc.). By identifying the effect of a given type of action 1304 along these axes, and, by assigning entities 1308 'drives' along each motivational axis and strategies to achieve those drives, we can model behavior.

Observation—an observation 1306 is a measurement of something about a Datum 1301, a set of data or an event 1303. Observations 1306 come from sources 1307.

General 1310—A general observation 1301 not specifically tied to a given datum 1310.

Report 1321—a report 1321 is a (partial) description from some perspective generally relating to an Event 1303.

Story 1326—a news story describing an event 1303.

Image 1327—a still image of an event 1303.

Sound 1329—a sound recording of an event 1303.

Video 1328—a video of an event 1303.

Map 1330—a map of an event 1303, stage 1304, or entity 1308.

Regarding 1311—an observation regarding a particular datum 1301.

Note 1322—a descriptive text note relating to the datum 1301.

CrossRef 1323—an explicit one-way cross-reference indicating some kind of named 'relationship' exists between one datum 1301 and another, preferably also specifying 'weight' of the relationship.

Delta 1324—an incremental change to all or part of a datum 1301, this is how the effect of the time axis is handled (a delta 1324 of time or change in time).

Relating 1312—A bi-directional link connecting two or more data together with additional information relating to the link.

Source 1307—A source is a logical source of observations 1306 or other Data.

Feed 1313—Most sources 1307 in the system consist of Client/Server servers that are receiving one or more streams of observations 1306 of a given type, that is; a newswire server is a source that outputs observations 1306 of type Story. In the preferred embodiment, feed sources 1313 are set up and allowed to run on a continuous basis.

Query 1314—sub-type of source 1307 that can be issued at any time, returning a collection of observations 1306 (or indeed any Datum 1301 derived type). The Query source type corresponds to one's normal interpretation of querying a database.

Event 1303—An event is the interactions of a set of actors 1302 on a stage 1304. Events 1303 must be reconstructed or predicted from the observations 1306 that describe them. It is the ability to predict events 1303 and then to adjust actions 1305 based on motives (not shown) and strategies that characterizes an entity 1308. It is the purpose of an intelligence system to discover, analyze and predict the occurrence of events 1303 and to present those results to a decision maker in order that he can take Actions 1305. The Actions 1305 of the decision maker then become a 'feed' to the system allowing the model for his strategies to be refined and thus used to better find opportunities for the beneficial application of those strategies occurring in the data stream impinging on the system.

Once the system designer has identified the ontology that is appropriate to allow the system to understand and manipulate the information it is designed to access (in the example above—understanding world events), the next step is to identify what sources of information, published or already acquired, are available to populate the various types defined in the system ontology. From these sources and given the nature of the problem to be solved, the system designed can then define the various fields to be contained in the ontology and the logical relationships between them. This process is expressed through the C* ontology definition and the examples above illustrate how this is done. At the same time, awareness of the desired user interface should be considered when building an ontology via the C* specifications. The final step is to implement any ontology-specific scripts and annotations as described in the Collections Patent Application. Once all this is done, all that is necessary is to auto-generate all storage tables necessary for the system as described and then begin the process of mining the selected sources into the system.

Having mined the information (a very rapid process), the system designer is free to evolve this ontology as dictated by actual use and by the needs of the system users. Because such changes are automatically and instantaneously reflected throughout the system, the system is now free to rapidly evolve without any of the constraints implied by the Bermuda Triangle problem experienced in the prior art. This software environment can be rapidly changed and extended, predominantly without any need for code modification, according to requirements, and without the fear of introducing new coding errors and bugs in the process. Indeed system modification and extension in this manner is possible by relatively un-skilled (in software terms) customer staff themselves meaning that it no longer requires any involvement from the original system developer. Moreover, this system can, through the ontology, unify data from a wide variety of different and incompatible sources and databases into a single whole wherein the data is unified and searchable without consideration of source. These two capabilities have for years been the holy grail of all software development processes, but neither has been achieved—until now.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for rapid generation of software applications from a describing ontology as expressed in an ontology definition language comprising the following:
   a) a processor;
   b) one or more storage devices accessible from said processor for storing and retrieving data and to provide persistent storage;
   c) a run-time discoverable and alterable types system describing arbitrary binary structures, their constituent fields, and relationships between them;
   d) a memory system for instantiating and manipulating arbitrary collections of said data and its interrelations described using said types system, as obtained from said persistent storage in said one or more storage devices;
   e) an ontology description language, or ODL, wherein said ODL is derived by extensions to a standard computer programming base language as implemented using said types system;
   f) a collections system wherein a plurality of data containers can be registered with said collections system via a plug-in registry;
   g) a database creation engine wherein said database creation engine uses specifications given in said ODL to automatically generate and handle one or more persistent storage tables necessary in said data containers that have been registered with said collections system; and
   h) a user interface creation engine, wherein said user interface creation engine uses said ODL to automatically generate a user interface that permits display, interaction with, and querying of said data residing in said persistent storage in said one or more storage devices.

2. The system of claim 1, wherein said memory system uses information in said ODL to unify one or more arbitrary collections of data into one or more federated data containers such that each said federated data container is associated with one or more types of fields in a given object.

3. The system of claim 2, wherein at least one of said federated data containers is a relational database.

4. The system of claim 2, wherein at least one of said federated data containers is an inverted text file query engine.

5. The system of claim 2, further comprising a query system for constructing and issuing data requests to said one or more federated data containers.

6. The system of claim 5, wherein said query system is capable of assembling a data resulting from said data requests.

7. The system of claim 6, wherein said query system is logically separated into two distinct layers such that each said distinct layer independently handles different aspects of said issued data requests and said data resulting from said assembling process performed by said query system.

8. The system of claim 7, wherein one layer of said query system is a lower layer, which handles container specific aspects of a query.

9. The system of claim 7, wherein one layer of said query system is an upper layer, which handles cross-container queries and assembly of a data resulting from said cross-container queries via logical operations such as AND, OR, and NOT.

10. The system of claim 1, wherein said computer programming base language used to create said ODL is a C programming language.

11. The system of claim 1, wherein said ODL includes a symbol and syntax for expressing a persistent reference from a field of a type to an object in said persistent storage.

12. The system of claim 6, wherein said ODL utilizes a first character such as '#' to identify said persistent reference.

13. The system of claim 1, wherein said ODL includes a symbol and syntax for expressing a collection reference from a field of a type to a collection of data held in said persistent storage.

14. The system of claim 13, wherein said ODL utilizes a first character string such as '@@' to identify said collection reference.

15. The system of claim 1, wherein said ODL includes a symbol and syntax for expressing an echo field for any given reference to said persistent storage wherein said echo field can be used to automate data retrieval.

16. The system of claim 15, wherein said ODL utilizes a second character string such as '><' to specify said echo field.

17. The system of claim 1, wherein said ODL includes the ability to specify and manipulate named, executable scripts and annotations on a per-type and per-field basis through said ODL.

18. The system of claim 1, wherein said ODL is built to organize data relating to world events.

19. The system of claim 18, wherein an uppermost layer of said ODL includes one or more of the following: Actor, Action, Stage, Event, Observation, and Source.

* * * * *

UNITED STATES PATENT AND TRADEMARK OFFICE
CERTIFICATE OF CORRECTION

PATENT NO.         : 7,240,330 B2                                                   Page 1 of 1
APPLICATION NO.   : 10/357283
DATED             : July 3, 2007
INVENTOR(S)       : John Fairweather It is certified that error appears in the above-identified patent and that said Letters Patent is hereby corrected as shown below:

<u>Column 33,</u>
Line 17, Delete the number "6" and replace with the number -- 11 --.

Signed and Sealed this

Eighteenth Day of September, 2007

JON W. DUDAS
*Director of the United States Patent and Trademark Office*